US011113559B2

(12) United States Patent
Kobayashi et al.

(10) Patent No.: US 11,113,559 B2
(45) Date of Patent: Sep. 7, 2021

(54) INFORMATION PROCESSING APPARATUS FOR IMPROVING TEXT DATA RECOGNITION, INFORMATION PROCESSING METHOD, AND NON-TRANSITORY RECORDING MEDIUM

(71) Applicants: Hiroshi Kobayashi, Kanagawa (JP); Yoshiharu Tojo, Kanagawa (JP); Koji Ishikura, Kanagawa (JP); Toshifumi Yamaai, Kanagawa (JP)

(72) Inventors: Hiroshi Kobayashi, Kanagawa (JP); Yoshiharu Tojo, Kanagawa (JP); Koji Ishikura, Kanagawa (JP); Toshifumi Yamaai, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 83 days.

(21) Appl. No.: 16/512,604

(22) Filed: Jul. 16, 2019

(65) Prior Publication Data

US 2020/0026950 A1 Jan. 23, 2020

(30) Foreign Application Priority Data

Jul. 20, 2018 (JP) .............................. JP2018-137253
Jun. 21, 2019 (JP) .............................. JP2019-115412

(51) Int. Cl.
*G06K 9/46* (2006.01)
(52) U.S. Cl.
CPC ........... *G06K 9/46* (2013.01); *G06K 2209/01* (2013.01)

(58) Field of Classification Search
CPC .. G06K 9/46; G06K 2209/01; G06K 9/00469; G06K 9/00449
See application file for complete search history.

(56) References Cited

U.S. PATENT DOCUMENTS

| 7,787,158 B2 * | 8/2010 | Matsuda | ............ H04N 1/32128 358/462 |
| 2002/0025072 A1 | 2/2002 | Yamaai | |
| 2003/0174904 A1 | 9/2003 | Yamaai | |
| 2004/0220898 A1 * | 11/2004 | Eguchi | ................ G06F 16/5854 |
| 2005/0111052 A1 * | 5/2005 | Nishikawa | .............. G06F 16/56 358/448 |
| 2005/0278624 A1 * | 12/2005 | Nishikawa | ......... G06K 9/00442 715/249 |
| 2007/0217710 A1 | 9/2007 | Yamaai | |
| 2008/0069473 A1 | 3/2008 | Tojo | |
| 2009/0030671 A1 * | 1/2009 | Kwon | ................... G06F 40/103 704/2 |
| 2011/0222776 A1 | 9/2011 | Jiang et al. | |
| 2012/0127522 A1 * | 5/2012 | Uchiyama | ............ H04N 1/3255 358/1.15 |
| 2013/0114099 A1 * | 5/2013 | Misawa | ............. G06K 9/00442 358/1.13 |

(Continued)

FOREIGN PATENT DOCUMENTS

JP 2012-190434 10/2012

*Primary Examiner* — Aaron W Carter
(74) *Attorney, Agent, or Firm* — IPUSA, PLLC

(57) ABSTRACT

An information processing apparatus includes processing circuitry that acquires an electronic file containing first text data, and determines, based on the acquired electronic file, whether to use the first text data or second text data to perform a process. The second text data is generated through character recognition performed on an image contained in the acquired electronic file.

12 Claims, 23 Drawing Sheets

(56) References Cited

U.S. PATENT DOCUMENTS

| | | | |
|---|---|---|---|
| 2015/0248382 A1* | 9/2015 | Shin | G06F 40/143 |
| | | | 715/239 |
| 2015/0281739 A1* | 10/2015 | Russell | G06K 9/6857 |
| | | | 382/182 |
| 2016/0014296 A1* | 1/2016 | Saka | H04N 1/41 |
| | | | 358/3.24 |
| 2017/0351913 A1* | 12/2017 | Chen | G06K 9/46 |
| 2019/0268487 A1* | 8/2019 | Fujiki | H04N 1/00331 |
| 2019/0286881 A1* | 9/2019 | Hirakata | G06K 9/00161 |
| 2019/0303701 A1* | 10/2019 | Kazume | G06F 16/164 |
| 2020/0026752 A1* | 1/2020 | Ishikura | G06F 40/174 |
| 2020/0026915 A1* | 1/2020 | Tojo | G06K 9/00463 |
| 2020/0026950 A1* | 1/2020 | Kobayashi | G06K 9/00449 |

* cited by examiner

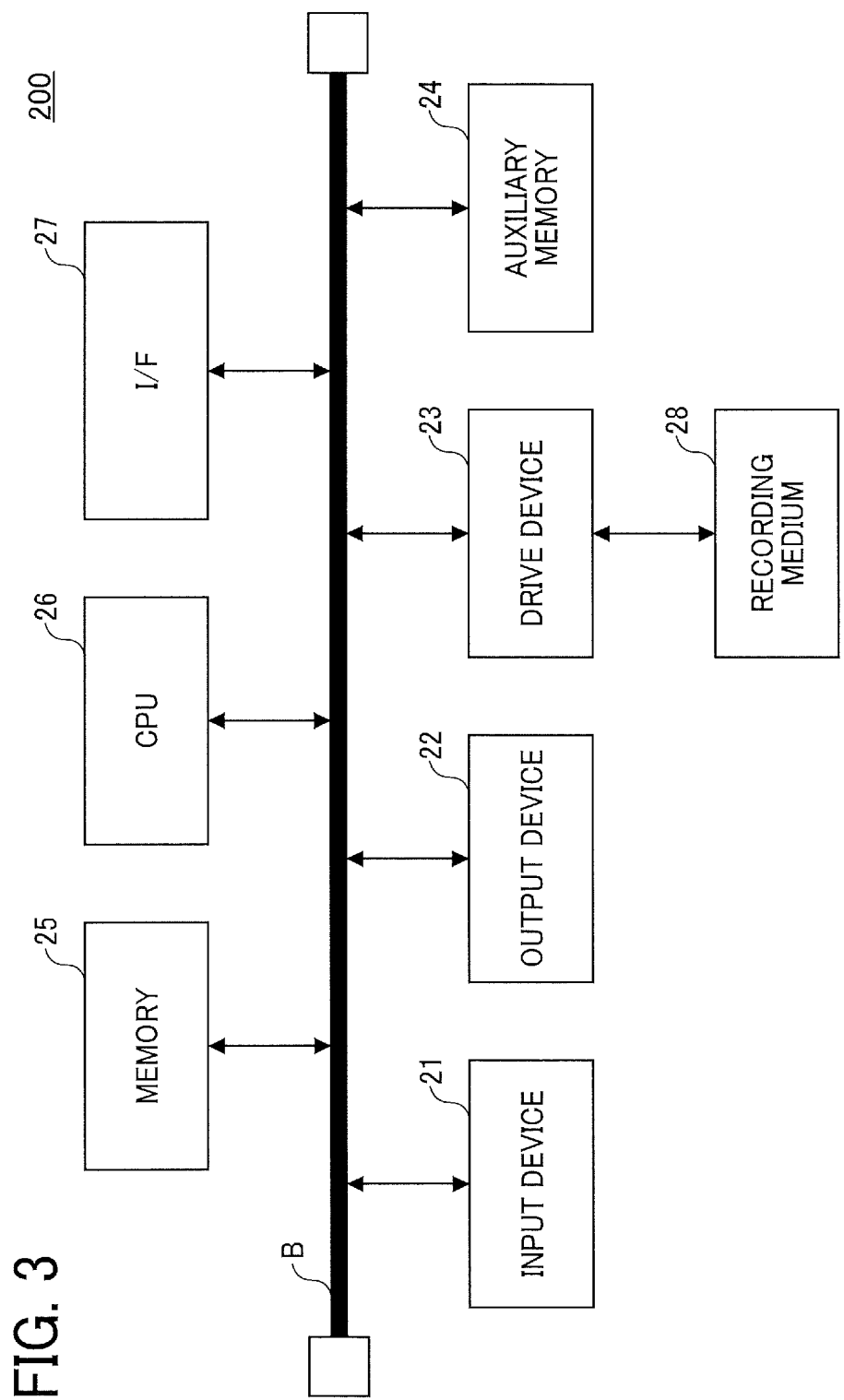

FIG. 4

| DEFINITION ID | DEFINITION TYPE | DOCUMENT TYPE | IDENTIFICATION CHARACTER STRING |
|---|---|---|---|
| H01 | GENERAL-PURPOSE DEFINITION INFORMATION | GENERAL INVOICE SHEET | INVOICE, INVOICE SHEET |
| H02 | GENERAL-PURPOSE DEFINITION INFORMATION | QUOTATION SHEET | QUOTATION, QUOTING, QUOTE |
| H03 | GENERAL-PURPOSE DEFINITION INFORMATION | ORDER SHEET | ORDER, ORDERING, ORDER SHEET |
| S01 | SPECIFIC DEFINITION INFORMATION | CORPORATION U | UNIMAT XXX |
| S02 | SPECIFIC DEFINITION INFORMATION | SLIP SHEET FOR CORPORATION S | SA XXX |
| A01 | INDIVIDUAL COMPANY DEFINITION INFORMATION | INVOICE SHEET FOR CORPORATION R | CORPORATION R + INVOICE |
| A02 | INDIVIDUAL COMPANY DEFINITION INFORMATION | ... | ... |
| B01 | INDIVIDUAL COMPANY DEFINITION INFORMATION | QUOTATION SHEET FOR CORPORATION T | CORPORATION T + QUOTATION |

LEDGER SHEET DEFINITION DB — 250
- GENERAL-PURPOSE DEFINITION INFORMATION — 251
- INDIVIDUAL COMPANY DEFINITION INFORMATION — 252
- SPECIFIC DEFINITION INFORMATION — 253

DEFINITION ID = H01 (INVOICE SHEET)

| ITEM ID | ITEM NAME | DIREC-TION | DISTANCE (RIGHT) | DISTANCE (LEFT) |
|---|---|---|---|---|
| 1 | | | | |
| 2 | TOTAL SUM | RD | | |
| 3 | SUBTOTAL | R | | |
| 4 | INVOICE NUMBER:; INVOICE NO. | R | | |
| 5 | | | | |
| 6 | CODE; ARTICLE CODE; PRODUCT NUMBER | D | | |
| 7 | ITEM NAME; ARTICLE NAME; PRODUCT NAME | D | | |
| 8 | QUANTITY | D | | |
| 9 | AMOUNT | D | | |
| 10 | UNIT PRICE | D | | |
| 11 | PRICE; PRICE (TAX EXCLUDED) | D | | |
| 12 | PAYEE ACCOUNT; BANK NAME:; BANK NAME, BANK NAME, BANK NAME: | R | | |
| 13 | BRANCH NAME, BRANCH NAME, BRANCH NAME, BRANCH NAME, BRANCH NAME: | R | | |
| 14 | ACCOUNT; ACCOUNT TYPE | R | | |
| 15 | ACCOUNT NUMBER; ACCOUNT NO. | R | | |
| 16 | NAME ON ACCOUNT | R | | |
| 17 | PAYMENT DUE DATE | R | | |

FIG. 7

| DEFINITION ID = A01 (INVOICE SHEET FOR CORPORATION R), USER ID = A | | | | | |
|---|---|---|---|---|---|
| ITEM ID | ITEM NAME | DIREC-TION | DISTANCE (RIGHT) | DISTANCE (LEFT) | |
| 2 | TOTAL | RD | | | |
| 3 | SUBTOTAL | R | | | |
| 11 | PRICE; PRICE (TAX EXCLUDED) | D | | | |
| 17 | PAYMENT DUE DATE | R | | | |
| | ... | | | | |

DEFINITION ID = S01 (SLIP SHEET FOR CORPORATION S)

| ITEM ID | ITEM NAME | DIREC-TION | DISTANCE (RIGHT) | DISTANCE (LEFT) |
|---|---|---|---|---|
| 2 | TOTAL SUM | RD | | |
| 3 | SUBTOTAL | R | | |
| 4 | INVOICE NUMBER; INVOICE NO. | R | | |
| 6 | CODE; ARTICLE CODE; PRODUCT NUMBER | D | | |
| 7 | ITEM NAME; ARTICLE NAME; PRODUCT NAME | D | | |
| 8 | QUANTITY | D | | |
| 9 | AMOUNT | D | | |
| 10 | UNIT PRICE | D | | |
| 11 | PRICE; PRICE (TAX EXCLUDED) | D | | |
| 17 | PAYMENT DUE DATE | R | | |

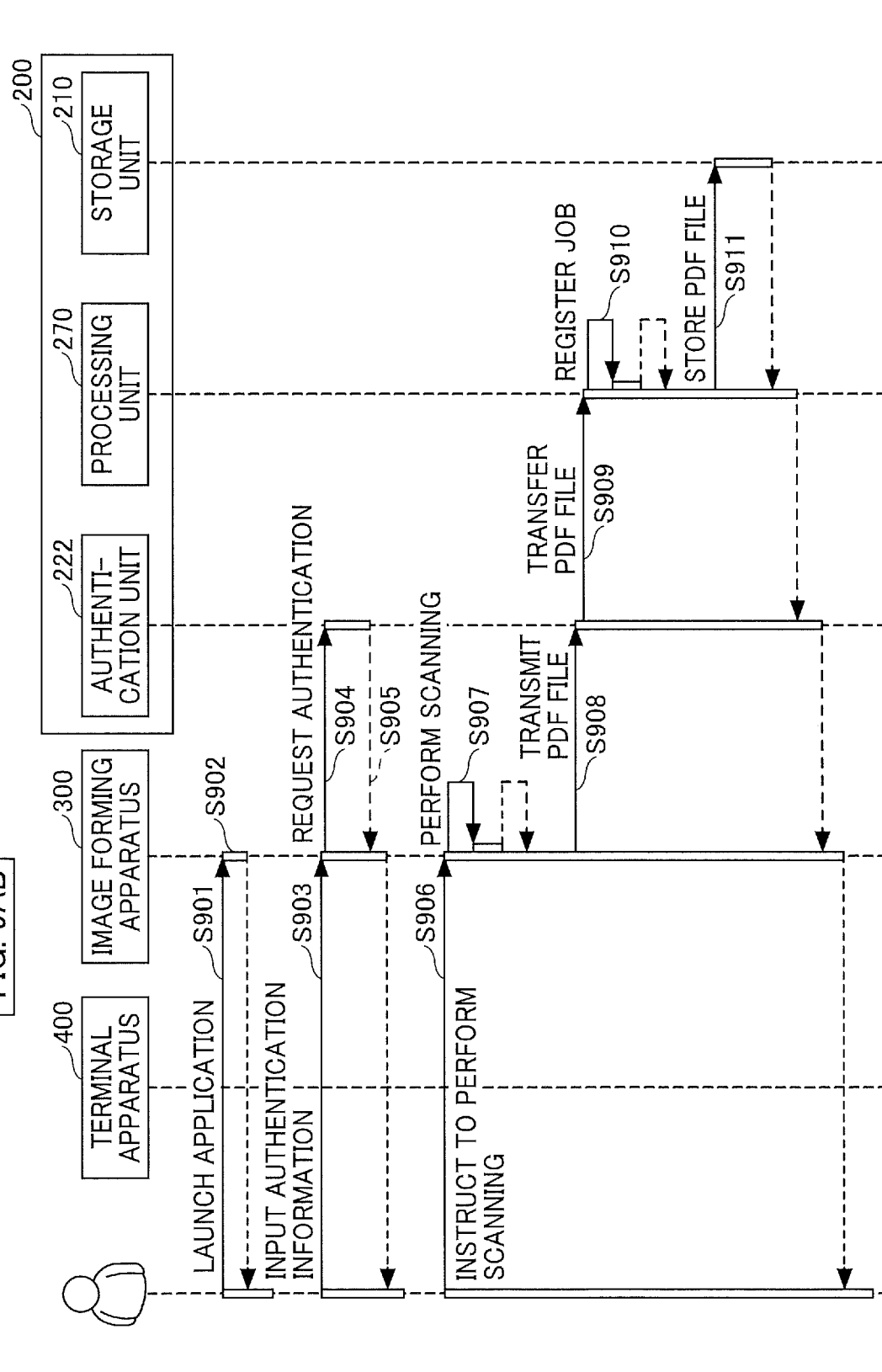

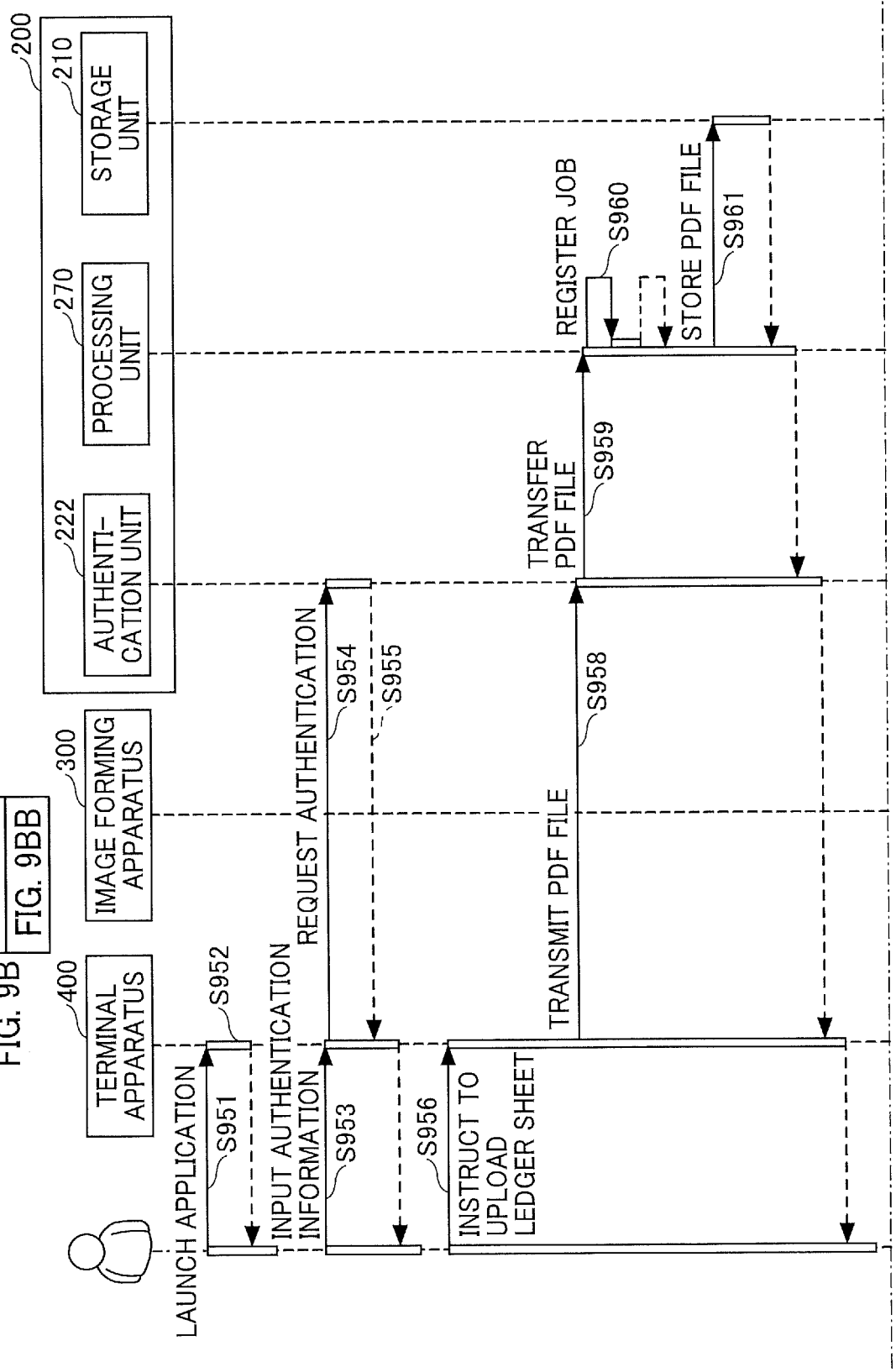

FIG. 10

| JOB ID | USER ID | LEDGER SHEET IMAGE FILE PATH | RECOGNITION RESULT FILE PATH | STATUS | DEFINITION ID |
|---|---|---|---|---|---|
| J1 | A123 | XXX | YYYY | COMPLETED | H01, A01 |
| J2 | B111 | XXY | ... | ... | S01 |
| ... | ... | ... | ... | ... | ... |

| ID | COORDINATE X | COORDINATE Y | CHARACTER WIDTH | CHARACTER HEIGHT | DEGREE OF CERTAINTY | CHARACTER | |
|---|---|---|---|---|---|---|---|
| 86 | 785 | 552 | 75 | 45 | 99 | 請 | ← C1 |
| 87 | 872 | 551 | 27 | 45 | 99 | 求 | ← C2 |
| 88 | 899 | 551 | 14 | 45 | 99 | 書 | ← C3 |
| ... | ... | ... | ... | ... | ... | ... | |
| 96 | 1389 | 605 | 39 | 38 | 99 | R | ← C4 |
| 97 | 1432 | 606 | 36 | 36 | 99 | 社 | ← C5 |
| ... | ... | ... | ... | ... | ... | ... | |
| 470 | 907 | 1721 | 38 | 36 | 98 | 計 | ← C6 |
| 471 | 1859 | 1724 | 15 | 30 | 99 | 1 | ← C7 |
| 472 | 1882 | 1724 | 12 | 30 | 99 | 2 | ← C8 |
| 473 | 1905 | 1749 | 6 | 10 | 98 | , | ← C9 |
| 474 | 1915 | 1724 | 18 | 31 | 99 | 9 | ← C10 |
| 475 | 1941 | 1724 | 11 | 30 | 98 | 6 | ← C11 |
| 476 | 1965 | 1724 | 20 | 30 | 98 | 0 | ← C12 |

| ID | COORDINATE X | COORDINATE Y | CHARACTER STRING WIDTH | CHARACTER STRING HEIGHT | CHARACTER STRING |
|---|---|---|---|---|---|
| 19 | 780 | 546 | 150 | 56 | 請求書 |
| 80 | 1384 | 600 | 475 | 49 | R社 |
| 81 | 902 | 1716 | 48 | 46 | 計 |
|  | 1854 | 1719 | 136 | 45 | 12,960 |

FIG. 18

EXTRACTED BASED ON "GENERAL INVOICE SHEET" AND "INVOICE SHEET FOR CORPORATION R"

INVOICE SHEET

DATE OF ISSUE: MAY 29, 2017
DATE OF INVOICE: MAY 29, 2017

HIGASHI-SHINAGAWA XXX,
SHINAGAWA-KU, TOKYO

CORPORATION R
XXX BUILDING, AKASAKA,
MINATO-KU, TOKYO

TEL 03-XXXX-XXXX
SAMPLE LTD.
ATTN: XXX, SECTION 1,
FIRST SALES DEPARTMENT

PROCUREMENT DEPARTMENT
SECTION
HARDWARE PROCUREMENT
TEL: 03-xxxx-xxxx

××××××××××  ××××××××××
××××××××××  ××××××××××

DESIGNATED ACCOUNT:
××××××  ××××××

| INVOICE NUMBER | MODEL NUMBER | TRANSFER NUMBER |
|---|---|---|
| A1238E4 | Y-AB-32456 | 100P1E |

ITEM NAME
72-INCH TV

DESCRIPTION

| QUANTITY OF ORDER | UNIT | CURRENCY | UNIT PRICE | TOTAL |
|---|---|---|---|---|
| 1 | PACKAGE | DOLLAR | 12,960 | 12,960 |

DELIVERY DATE
2017/05/16

DELIVERY ADDRESS

INVOICE INFORMATION

| INVOICE ISSUER | CORPORATION R |
|---|---|
| BILLING AMOUNT | 12,960 |
| BILLING AMOUNT (TAX EXCLUDED) | N/A |
| INVOICE NUMBER | A123BF4 |
| DATE OF INVOICE | MAY 29, 2017 |
| CARRYOVER FROM PREVIOUS MONTH | XXXXX |
| SALES OF CURRENT MONTH | XXXXX |
| CUTOFF DATE | XXXXX |
| PAYMENT DATE | XXXXX |
| ORDER NUMBER | XXXXX |

[REGISTER]

FIG. 19

```
<?xml version="1.0" encoding="UTF-8"?>
<CorporationR>
<Image>SampleLtdInvoiceSheet.pdf</Image>
<Image_jshfilename>C:/folder/SampleLtdInvoiceSheet.pdf </Image_jshfilename>
<modifyDate>2018-06-12T09:36:02</modifyDate>
<processDate>2018-06-26T13:26:33</processDate>
<result>true</result>
<primarykey>-1</primarykey>
<2(※Total)>12,960</2>
<4(※InvoiceNumber)>A123BF4</4>
・・・・・・
</CorporationR>
```

151

INFORMATION PROCESSING APPARATUS FOR IMPROVING TEXT DATA RECOGNITION, INFORMATION PROCESSING METHOD, AND NON-TRANSITORY RECORDING MEDIUM

CROSS-REFERENCES TO RELATED APPLICATION

This patent application is based on and claims priority pursuant to 35 U.S.C. § 119(a) to Japanese Patent Application Nos. 2018-137253 filed on Jul. 20, 2018, and 2019-115412 filed on Jun. 21, 2019, in the Japan Patent Office, the entire disclosure of which is hereby incorporated by reference herein.

BACKGROUND

Technical Field

The present invention relates to an information processing apparatus, an information processing method, and a non-transitory recording medium.

Description of the Related Art

There is a technique of optically reading various types of documents printed on sheets such as paper to generate files such as portable document format (PDF) files, and recognizing characters in images contained in the generated files such as PDF files.

There is another technique of recognizing characters in an image of a document such as a ledger sheet, and extracting character strings of items from the image.

According to such existing techniques, however, if a character in the image in the file such as a PDF file is incorrectly recognized, for example, correct text data may not be obtained.

SUMMARY

In one embodiment of this invention, there is provided an improved information processing apparatus that includes, for example, processing circuitry that acquires an electronic file containing first text data, and determines, based on the acquired electronic file, whether to use the first text data or second text data to perform a process. The second text data is generated through character recognition performed on an image contained in the acquired electronic file.

In one embodiment of this invention, there is provided an improved information processing method that includes, for example, acquiring an electronic file containing first text data, and determining, based on the acquired electronic file, whether to use the first text data or second text data to perform a process. The second text data is generated through character recognition performed on an image contained in the acquired electronic file.

In one embodiment of this invention, there is provided a non-transitory recording medium storing a plurality of instructions which, when executed by one or more processors, cause the processors to perform the above-described information processing method.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 3 is a diagram illustrating an example of the hardware configuration of the server of the first embodiment;

FIG. 4 is a diagram illustrating an example of a type determination database of the server of the first embodiment;

FIG. 5 is a diagram illustrating types of ledger sheet definition information stored in a ledger sheet definition database of the server of the first embodiment;

FIG. 6 is a diagram illustrating an example of general-purpose definition information of the first embodiment;

FIG. 7 is a diagram illustrating an example of individual company definition information of the first embodiment;

FIG. 8 is a diagram illustrating an example of specific definition information of the first embodiment;

FIG. 10 is a diagram illustrating an example of a job list of the first embodiment;

FIG. 12 is a diagram illustrating an example of text data to be processed in the first embodiment;

FIG. 18 is a diagram illustrating an example of a recognition result check screen of the first embodiment;

FIG. 19 is a diagram illustrating an example of recognition result data of the first embodiment.

Figure 1:
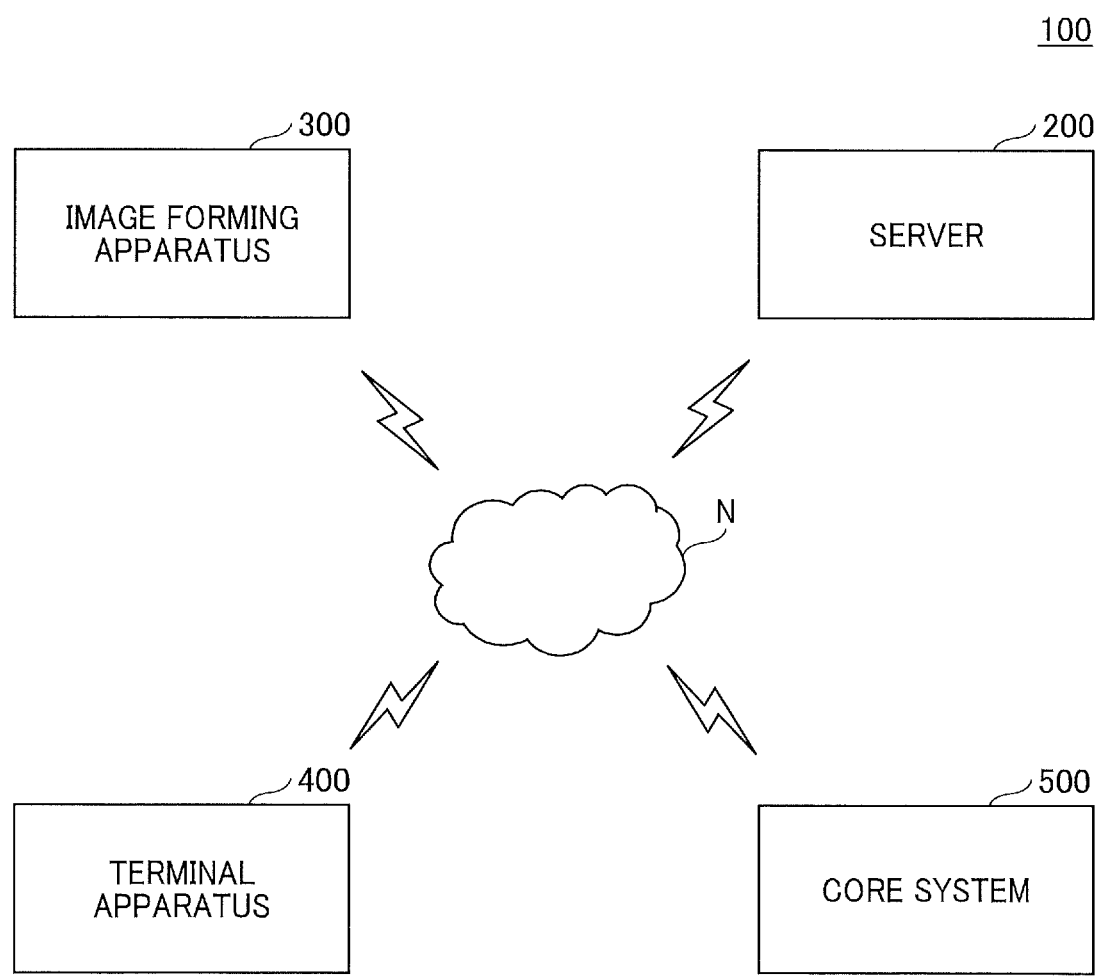
FIG. 1 is a diagram illustrating an example of the system configuration of an information processing system of a first embodiment of the present invention.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. In the drawings illustrating embodiments of the present invention, members or components having the same function or shape will be denoted with the same reference numerals to avoid redundant description.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

A first embodiment of the present invention will be described. In the first embodiment, a description will be given of an example in which a server 200 extracts data of items from a file of a ledger sheet received from an image forming apparatus 300 or a terminal apparatus 400.

In the first embodiment, if the received file does not contain text data subjected to the conversion of the file format (hereinafter referred to as the text data subjected to the file format conversion), for example, the server 200 uses text data generated through character recognition performed on the data of the received file. If the received file contains the text data subjected to the file format conversion, for example, the server 200 uses the text data subjected to the file format conversion. The file containing the text data subjected to the file format conversion includes, for example, a PDF file converted from a file of a document, table, or slide in a predetermined file format, for example. Thereby, the text data used by the server 200 is improved in accuracy. Although the following description will be given of an example in which the PDF file is processed, a technique disclosed herein is also applicable to a system that processes a file in a file format other than the PDF.

The first embodiment will be described below with reference to FIGS. 1 to 17.

FIG. 1 is a diagram illustrating an example of the system configuration of an information processing system of the first embodiment.

An information processing system 100 of the first embodiment includes the server 200, the image forming apparatus 300, and the terminal apparatus 400. In the information processing system 100 of the first embodiment, the server 200, the image forming apparatus 300, and the terminal apparatus 400 are connected via a network N.

The terminal apparatus 400 of the first embodiment is also connected to a core system 500 via the network N, for example. The core system 500 is a system that performs a specific process with a result of recognizing a ledger sheet in the information processing system 100 of the first embodiment, for example. Specifically, the core system 500 may be an accounting system or a quotation preparation system, for example.

In the information processing system 100 of the first embodiment, the server 200 receives, from the image forming apparatus 300, a PDF file containing an image of a ledger sheet read by a scanner function of the image forming apparatus 300. The server 200 further receives, from the terminal apparatus 400, a PDF file containing the text data subjected to the file format conversion. The server 200 extracts, from the received PDF file, items and the values of the items included in the ledger sheet, and generates text data associating the items with the values of the items.

In the following description, the image of the ledger sheet read by the scanner function of the image forming apparatus 300 will be referred to as the ledger sheet image.

Further, in the following description, extracting the items and the values of the items included in the ledger sheet and converting the items and the values of the items into the text data associating the items with the values of the items will be referred to as ledger sheet recognition.

Figure 2:
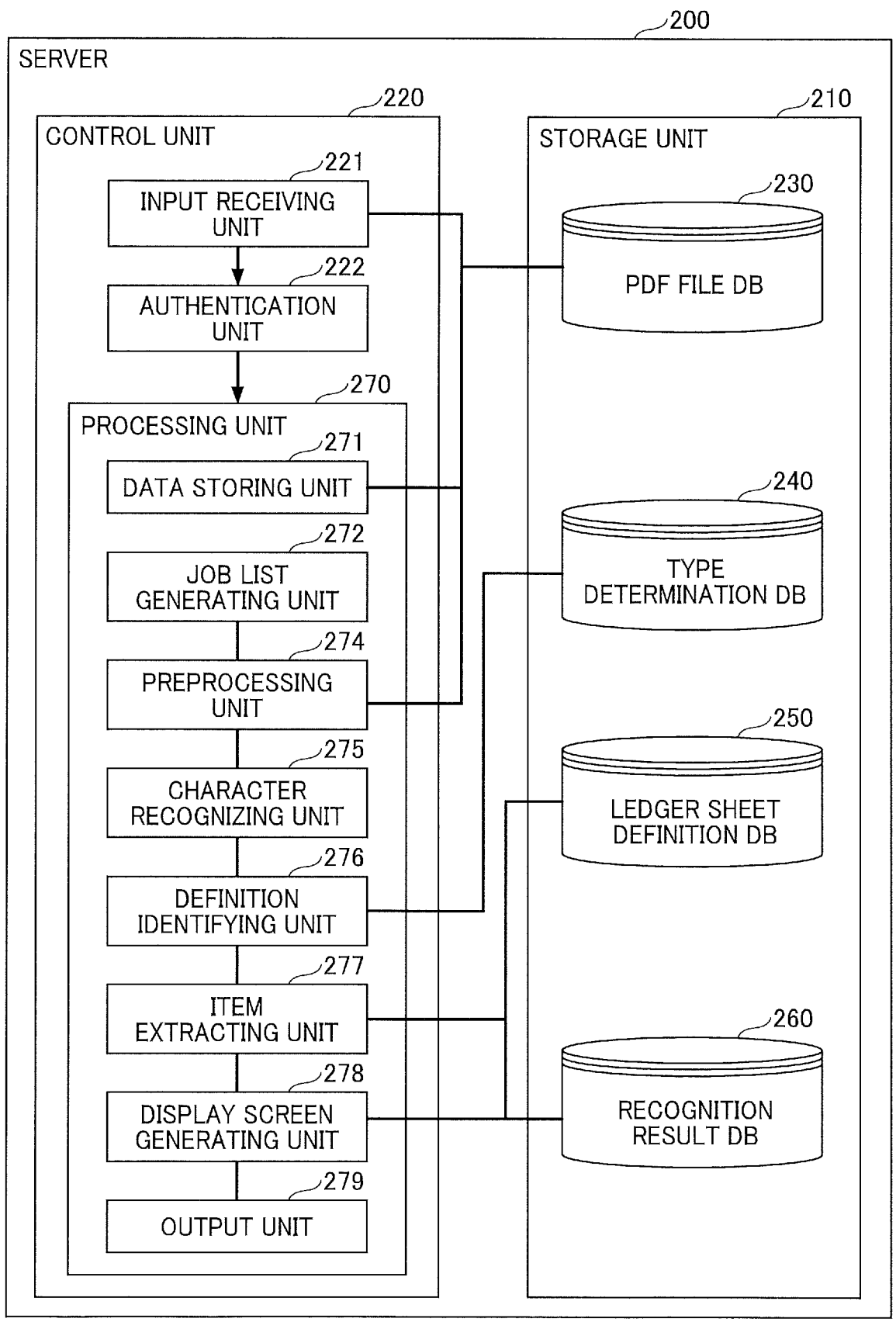
FIG. 2 is a diagram illustrating functions of a server forming the information processing system of the first embodiment.

As illustrated in FIG. 2, the server 200 of the first embodiment includes a storage unit 210 and a control unit 220. The storage unit 210 includes a PDF file database (DB) 230, a type determination DB 240, a ledger sheet definition DB 250, and a recognition result DB 260.

The PDF file DB 230 stores a PDF file. The type determination DB 240 stores information referred to to determine the type of a ledger sheet. The ledger sheet definition DB 250 stores ledger sheet definition information referred to in the ledger sheet recognition performed by the control unit 220. The recognition result DB 260 stores information of a result of the ledger sheet recognition by the control unit 220.

The control unit 220 of the first embodiment acquires the PDF file stored in the PDF file DB 230, and refers to the type determination DB 240 to determine the type of the ledger sheet and identify the ledger sheet definition information to be referred to. The control unit 220 then performs the ledger sheet recognition with the identified ledger sheet definition information in the ledger sheet definition DB 250, and stores a result of the ledger sheet recognition in the recognition result DB 260. The ledger sheet definition information includes information representing the description positions of item names in the ledger sheet and information representing the relative positions of the item names and the values of the items.

In the ledger sheet recognition, the control unit 220 of the first embodiment refers to general-purpose definition information and individual company definition information stored in the ledger sheet definition DB 250.

The general-purpose definition information of the first embodiment is ledger sheet definition information that defines the layout of a typical ledger sheet. The individual company definition information of the first embodiment is ledger sheet definition information that defines the layout of a ledger sheet unique to a user of the information processing system 100. Details of the type determination DB 240 and the ledger sheet definition DB 250 will be described later.

The first embodiment thus uses two types of ledger sheet definition information in the ledger sheet recognition to enable the recognition of a user-unique ledger sheet as well as the recognition of a general-purpose ledger sheet, thereby improving the accuracy of the ledger sheet recognition.

In the information processing system 100 of the first embodiment, the image forming apparatus 300 is a multifunction peripheral (MFP) having the scanner function. The image forming apparatus 300 is installed with applications for implementing functions such as the scanner function, a copier function, and a facsimile function. When the application corresponding to a desired one of these functions is selected, the desired function is implemented.

The terminal apparatus 400 of the first embodiment is used by the user of the information processing system 100. The terminal apparatus 400 may display the result of the ledger sheet recognition performed by the server 200.

In the first embodiment, the user is a company or a firm, for example. More specifically, the user is a business establishment, a company, a firm, or an organization, for example, which has a contract to use a service provided by the information processing system 100.

In the example configuration of FIG. 2, the server 200 includes four databases in the storage unit 210. The databases, however, are not limited to this configuration. All or a part of the databases may be disposed in an external apparatus outside the server 200.

Further, in the example of FIG. 2, the control unit 220 is implemented by the server 200. However, the control unit 220 is not necessarily implemented thereby, and may be implemented by a plurality of information processing apparatuses.

Further, in the example of FIG. 1, the information processing system 100 includes one image forming apparatus 300 and one terminal apparatus 400. The information processing system 100, however, may include a desired number of image forming apparatuses 300 and a desired number of terminal apparatuses 400.

A hardware configuration of the server 200 of the first embodiment will now be described with FIG. 3.

FIG. 3 is a diagram illustrating an example of the hardware configuration of the server 200 of the first embodiment. The server 200 of the first embodiment is an information processing apparatus including an input device 21, an output device 22, a drive device 23, an auxiliary memory 24, a memory 25, a central processing unit (CPU) 26, and an interface (I/F) 27, which are connected to each other via a bus B.

The input device 21 is used to input a variety of information, and may include a keyboard and a pointing device, for example. The output device 22 is used to output a variety of information, and may include a display, for example. The I/F 27 includes a local area network (LAN) card, for example, and is used to connect the server 200 to the network N.

An information processing program, which is at least a part of a variety of programs controlling the server 200, is provided as stored and distributed in a recording medium 28 or as downloaded from the network N, for example. The recording medium 28 having the information processing program recorded thereon may include various types of storage media such as a storage medium on which information is optically, electrically, or magnetically recorded, such as a compact disc read only memory (CD-ROM), a flexible disc, or a magneto-optical disc, and a semiconductor memory on which information is electrically recorded, such as a ROM or a flash memory.

When the recording medium 28 having the information processing program recorded thereon is inserted in the drive device 23, the information processing program is installed in the auxiliary memory 24 from the recording medium 28 via the drive device 23. Alternatively, the information processing program may be downloaded from the network N and installed in the auxiliary memory 24 via the I/F 27.

The auxiliary memory 24 stores the installed information processing program, and also stores files and data to be used. The memory 25 stores the information processing program read from the auxiliary memory 24 at startup of the server 200. The CPU 26 implements later-described various processes in accordance with the information processing program stored in the memory 25.

The hardware configuration of the terminal apparatus 400 of the first embodiment is similar to that of the server 200, and thus description thereof will be omitted. The terminal apparatus 400 may be a tablet terminal apparatus or a smartphone, for example. Further, the terminal apparatus 400 may include a display and operation device implemented by a touch panel, for example, in place of the input device 21 and the output device 22.

A description will now be given of the type determination DB 240 and the ledger sheet definition DB 250 included in the server 200 of the first embodiment.

FIG. 4 is a diagram illustrating an example of the type determination DB 240 of the first embodiment. The type determination DB 240 of the first embodiment includes information items: "definition identification (ID)," "definition type," "document type," and "identification character string." In the type determination DB 240, the item "definition ID" is associated with the other items "definition type," "document type," and "identification character string." Information including the value of the item "definition ID" and the values of the other items "definition type," "document type," and "identification character string" will be referred to as the type determination information.

The value of the item "definition ID" is an identifier for identifying the ledger sheet definition information.

The value of the item "definition type" represents the type of the ledger sheet definition information. In the first embodiment, the types of the ledger sheet definition information include specific definition information as well as the general-purpose definition information and the individual company definition information. The specific definition information is ledger sheet definition information that defines a specific ledger sheet issued by a specific business operator, for example. Specifically, the specific ledger sheet is a commonly used courier slip, for example.

The value of the item "document type" represents the type of the ledger sheet. Specifically, the types of the ledger sheet include invoice sheet, quotation sheet, and order sheet, for example. The value of the item "identification character string" represents the character string for identifying the type of the ledger sheet. Specifically, for example, when the ledger sheet includes a character string "invoice sheet" or "invoice," the type of the ledger sheet represented by the item "document type" is "invoice sheet."

For instance, in the example of FIG. 4, the type of the ledger sheet definition information corresponding to a definition ID "H01" is the general-purpose definition information. The general-purpose definition information corresponding to the definition ID "H01" defines the layout of "invoice sheet," and is referred to when the character string "invoice" or "invoice sheet" is extracted from the PDF file.

The ledger sheet definition DB 250 of the first embodiment will now be described with FIGS. 5 to 8.

FIG. 5 is a diagram illustrating the types of the ledger sheet definition information stored in the ledger sheet definition DB 250 of the first embodiment. The ledger sheet definition DB 250 of the first embodiment stores general-purpose definition information 251, individual company definition information 252, and specific definition information 253.

The general-purpose definition information 251 of the first embodiment is ledger sheet definition information of a ledger sheet having a highly generalized layout used by a plurality of users. The general-purpose definition information 251 has the lowest priority among the three types of ledger sheet definition information.

The individual company definition information 252 of the first embodiment is ledger sheet definition information of a ledger sheet having a layout uniquely designed by a user, i.e., ledger sheet definition information dedicated to the user. The individual company definition information 252 has the highest priority among the three types of ledger sheet definition information in preference over the other two types of ledger sheet definition information.

The specific definition information 253 of the first embodiment is ledger sheet definition information of a ledger sheet having a commonly used layout. The specific definition information 253 has an intermediate priority among the three types of ledger sheet definition information.

The control unit 220 of the first embodiment recognizes the PDF file by referring to these three types of ledger sheet definition information. In the first embodiment, therefore, if the layout of the ledger sheet in the PDF file is not defined by the general-purpose definition information 251 but is defined by the individual company definition information 252 or the specific definition information 253, for example, the control unit 220 is capable of recognizing the PDF file.

FIG. 6 is a diagram illustrating an example of the general-purpose definition information 251 of the first embodiment. The general-purpose definition information 251 is generated for each definition ID, and includes information items such as "item ID," "item name," "direction," and "distance." That is, the general-purpose definition information 251 of the first embodiment has the item "definition ID" and the other items "item name," "direction," and "distance" associated with the item "definition ID," and includes the value of the item "definition ID" and the values of the other items "item name," "direction," and "distance."

The value of the item "item ID" is an identifier for identifying an item included in the ledger sheet. The value of the item "item name" represents the name of the item.

The items "direction" and "distance" represent the extraction range of the character string. For example, when the value of the item "direction" and the value of the item "distance" are RD and 20 mm, respectively, a character string is extracted from a range of 20 mm downward from the coordinates of the lower-right corner of a rectangle circumscribed on a character string representing the item name.

That is, the items "direction" and "distance" of the first embodiment are conditions representing the extraction range of the character string, and these conditions are associated with the item name. The conditions representing the extraction range of the character string are the items "direction" and "distance" in the example of FIG. 6, but may include another item.

For example, therefore, a character string extracted from a range of 20 mm downward from the coordinates of the lower-right corner of a rectangle circumscribed on the character string of an item name "total sum" corresponding to an item ID "2" is recognized as the value of the item corresponding to the item name "total sum."

The general-purpose definition information 251 includes information of all items included in the ledger sheet.

FIG. 7 is a diagram illustrating an example of the individual company definition information 252 of the first embodiment. The individual company definition information 252 of the first embodiment is registered for each user, and includes information items such as "user ID," "definition ID," "item name," "direction," and "distance."

The value of the item "user ID" is an identifier for identifying the user. In the first embodiment, the items "definition ID," "item name," "direction," and "distance" of the individual company definition information 252 are similar to those of the general-purpose definition information 251, and thus description thereof will be omitted.

In the first embodiment, when the definition type of the ledger sheet definition information is the individual company definition information, the definition ID of the ledger sheet definition information may include the user ID.

The user stores, in the individual company definition information 252, information of an item registering the item name and the conditions representing the range in which the value of the item is described. Therefore, an item ID included in the individual company definition information 252 may be one of the item IDs included in the general-purpose definition information 251.

The example of FIG. 7 illustrates the individual company definition information 252 registered by the user corresponding to a user ID "A." The definition ID and the document type of this individual company definition information 252 are "A01" and "invoice sheet for Corporation R," respectively.

FIG. 8 is a diagram illustrating an example of the specific definition information 253 of the first embodiment. The specific definition information 253 of the first embodiment is registered for each specific ledger sheet, and includes information items such as "definition ID, "item name," "direction," and "distance." In the first embodiment, the information items "definition ID, "item name," "direction," and "distance" of the specific definition information 253 in FIG. 8 are similar to those of the general-purpose definition information 251 in FIG. 6, and thus description thereof will be omitted.

The specific definition information 253 of the first embodiment may be set for each specific business operator. In this case, the specific definition information 253 may include "business operator ID" as an information item.

Referring back to FIG. 2, functions of the server 200 of the first embodiment will be described.

FIG. 2 is a diagram illustrating functions of the server 200 of the first embodiment. In the server 200 of the first embodiment, the CPU 26 reads and executes the information processing program stored in the memory 25 or the auxiliary memory 24, for example, to thereby implement the functions of units described below.

In the server 200 of the first embodiment, the control unit 220 includes an input receiving unit 221, an authentication unit 222, and a processing unit 270.

The input receiving unit 221 receives a variety of inputs to the server 200. Specifically, the input receiving unit 221 receives input of authentication information for login to the information processing system 100. The authentication information includes a user ID and a password, for example. The input receiving unit 221 further receives input of a PDF file transmitted from the image forming apparatus 300 or the terminal apparatus 400, for example.

The authentication unit 222 performs authentication based on the authentication information input to the input receiving unit 221. For example, the authentication unit 222 may transmit the input authentication information to an authentication server disposed outside the server 200, and may acquire a result of authentication performed by the authentication server. If the user is authenticated, the authentication unit 222 may transfer the PDF file received by the input receiving unit 221 to the processing unit 270.

When the input receiving unit 221 acquires the PDF file containing first text data, for example, the processing unit 270 determines, based on the PDF file, whether to use the first text data or second text data to perform a predetermined process. The second text data is generated through character recognition performed on the image contained in the PDF file. The predetermined process includes translation of characters acquired from the first data or the second data, as illustrated in FIG. 18, for example, but is not limited thereto.

The processing unit 270 includes a data storing unit 271, a job list generating unit 272, a preprocessing unit 274, a character recognizing unit 275, a definition identifying unit 276, an item extracting unit 277, a display screen generating unit 278, and an output unit 279.

In response to receipt of the PDF file from the image forming apparatus 300, for example, the data storing unit 271 stores the PDF file in the PDF file DB 230.

When the input receiving unit 221 receives input of image data, the job list generating unit 272 registers a job in a job list, and manages the job list. Details of the job list will be described later.

The preprocessing unit 274 performs preprocessing for ledger sheet recognition on the PDF file acquired from the PDF file DB 230.

The character recognizing unit 275 extracts, from the PDF file, character strings and information of the disposition positions of the character strings, and holds the extracted character strings and information as recognition result information. Details of the recognition result information will be described later.

With reference to the type determination DB 240, the definition identifying unit 276 identifies the definition IDs corresponding to the character strings included in the recognition result information. In other words, the definition identifying unit 276 is implemented by processing circuitry that, based on the character strings extracted from ledger sheet image data, identifies the ledger sheet definition information to be referred to in the ledger sheet recognition, and acquires the identified ledger sheet definition information from the ledger sheet definition DB 250.

Based on the ledger sheet definition information identified by the definition identifying unit 276 and the recognition result information, the item extracting unit 277 extracts items and the values of the items included in the ledger sheet image data, and associates the items with the values of the items, to thereby generate recognition result data associating the item Ds of the items with the values of the items. The item extracting unit 277 may generate a file in the extensible markup language (XML) format as the recognition result data. The item extracting unit 277 further extracts the description positions of the items in the ledger sheet and the relative positions of the items and the values of the items.

With the recognition result data stored in the recognition result DB 260, the display screen generating unit 278 generates a recognition result check screen. Each item name to be displayed on the recognition result check screen may previously be registered in association with the corresponding item ID. Then, when the recognition result check screen is generated, the item name corresponding to the item ID and included in the recognition result data may be identified and displayed on the recognition result check screen.

The output unit 279 outputs the recognition result check screen generated by the display screen generating unit 278. That is, the output unit 279 displays the recognition result check screen generated by the display screen generating unit 278 on a web browser running on the terminal apparatus 400.

Figure 9A:
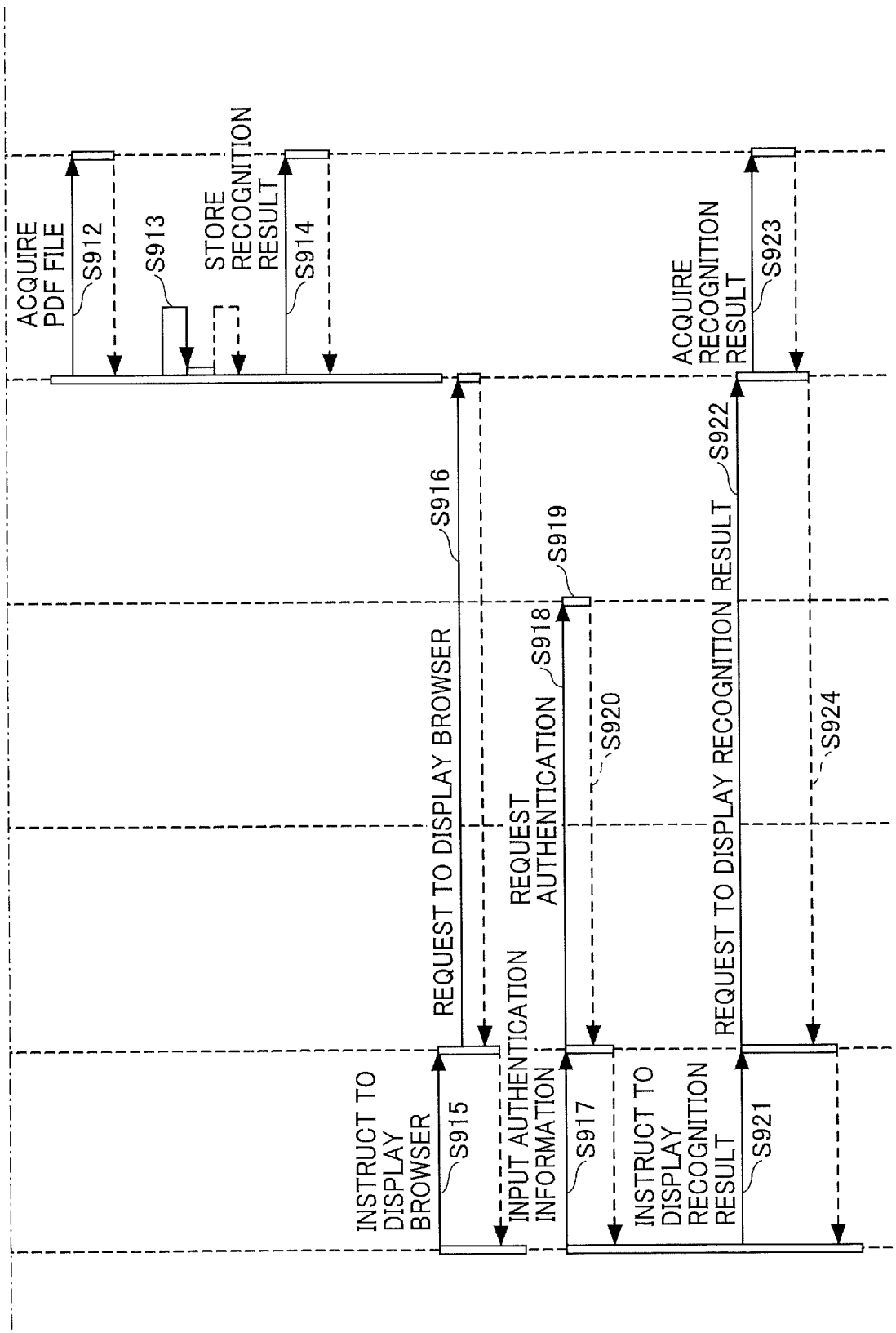
FIGS. 9AA and 9AB (FIG. 9A) are a sequence diagram illustrating an example of a process of the information processing system of the first embodiment.

With reference to FIG. 9A, a description will be given of an example of the process of the information processing system 100 of the first embodiment.

FIG. 9A (i.e., FIGS. 9AA and 9AB) is a sequence diagram illustrating an example of the process of the information processing system 100 of the first embodiment.

The following description will be given of an example in which the server 200 processes a PDF file received from the image forming apparatus 300.

In the information processing system 100, the image forming apparatus 300 receives a request from a user to launch an application for ledger sheet recognition (step S901), and launches the application (step S902).

The image forming apparatus 300 then receives input of the authentication information from the user (step S903), and transmits the authentication information to the server 200 and requests authentication (step S904).

In response to the authentication request, the server 200 performs the authentication with the authentication unit 222, and transmits a result of the authentication to the image forming apparatus 300 (step S905). The following processes are performed when the user is authenticated.

The image forming apparatus 300 then receives an instruction from the user to scan a ledger sheet (step S906), scans the ledger sheet, and generates a PDF file containing a scanned image of the ledger sheet (step S907). The image forming apparatus 300 then transmits the generated PDF file to the server 200 (step S908).

In the server 200, the input receiving unit 221 receives input of the PDF file, and the authentication unit 222 transfers the PDF file to the processing unit 270 (step S909). The server 200 may transfer the PDF file from the input receiving unit 221 to the processing unit 270 without via the authentication unit 222.

In the processing unit 270 of the server 200, in response to receipt of the PDF file, the job list generating unit 272 registers a job in the job list (step S910), and the data storing unit 271 stores the PDF file in the PDF file DB 230 (step S911).

The processing unit 270 then acquires the PDF file to be subjected to the ledger sheet recognition from the PDF file DB 230 (step S912), and executes the ledger sheet recognition process (step S913). Details of the process of step S913 will be described later.

The processing unit 270 then stores the recognition result data generated by the item extracting unit 277 in the recognition result DB 260 (step S914).

In the information processing system 100, when the terminal apparatus 400 receives input of an instruction from the user to display the browser (step S915), the terminal apparatus 400 requests the server 200 to display the browser to display the recognition result data (step S916).

The terminal apparatus 400 further receives input of the authentication information from the user (step S917), and transmits the authentication information to the server 200 (step S918).

The server 200 performs the authentication of the user with the authentication unit 222 (step S919), and transmits a result of the authentication to the terminal apparatus 400 (step S920). The following processes are performed when the user is authenticated.

Then, the terminal apparatus 400 receives input of an instruction from the user to display the recognition result of the ledger sheet image (step S921), and requests the server 200 to display the recognition result of the ledger sheet image (step S922).

In response to the request to display the recognition result of the ledger sheet image, the server 200 acquires the recognition result data stored in the recognition result DB 260 (step S923), and generates and displays the recognition result check screen on the browser on the terminal apparatus 400 (step S924) to allow the user to check the recognition result on the displayed recognition result check screen. Then, the procedure is completed.

Figure 9B:
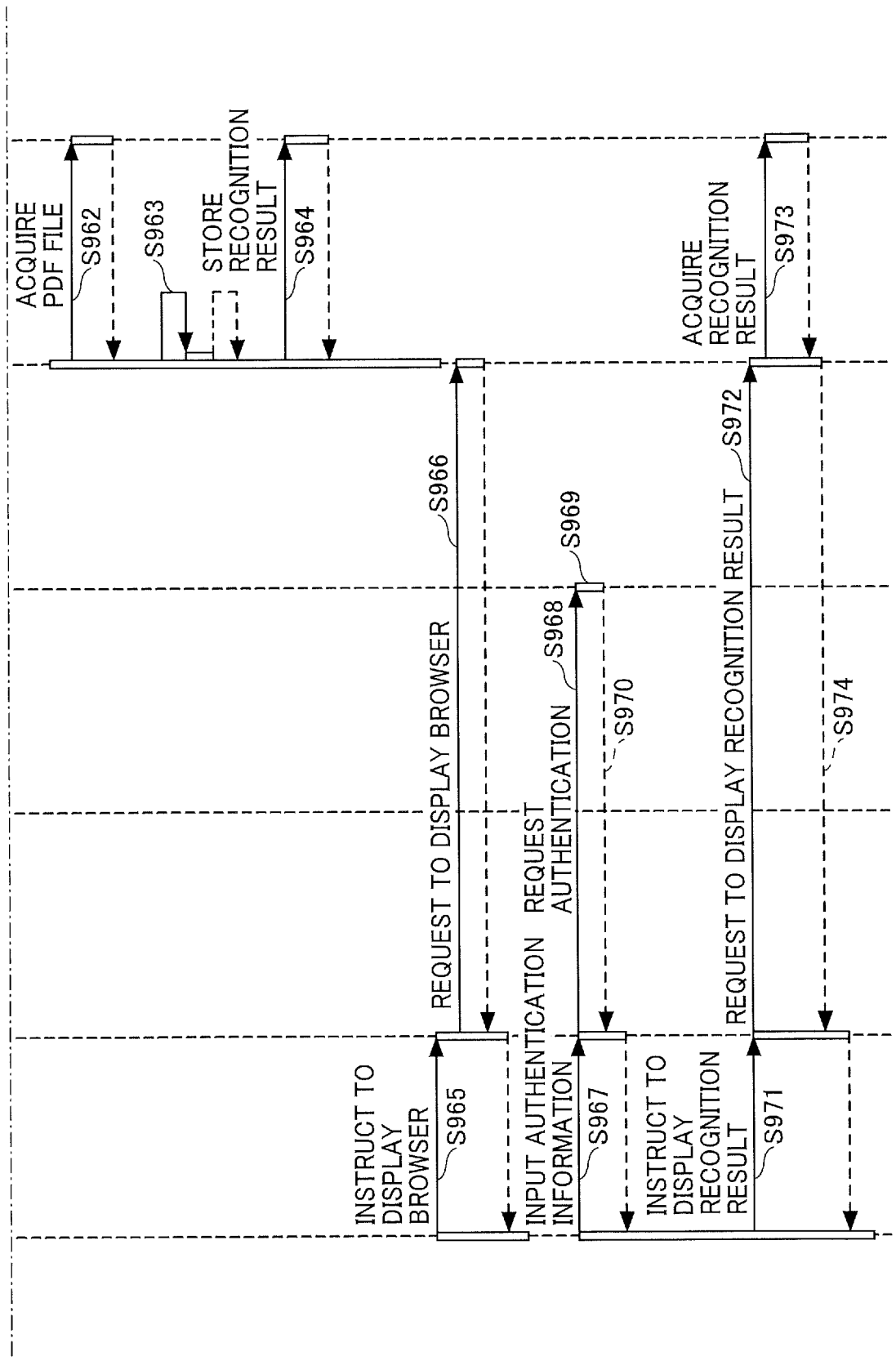
FIGS. 9BA and 9BB (FIG. 9B) are a sequence diagram illustrating another example of the process of the information processing system of the first embodiment.

With reference to FIG. 9B, a description will be given of another example of the process of the information processing system 100 of the first embodiment.

FIG. 9B (i.e., FIGS. 9BA and 9BB) is a sequence diagram illustrating another example of the process of the information processing system 100 of the first embodiment.

The following description will be given of an example in which the server 200 processes a PDF file received from the terminal apparatus 400.

In the information processing system 100, the terminal apparatus 400 receives a request from a user to launch the application for ledger sheet recognition (step S951), and launches the application (step S952).

The terminal apparatus 400 then receives input of the authentication information from the user (step S953), and transmits the authentication information to the server 200 and requests authentication (step S954).

In response to the authentication request, the server 200 performs the authentication with the authentication unit 222, and transmits a result of the authentication to the terminal apparatus 400 (step S955). The following processes are performed when the user is authenticated.

The terminal apparatus 400 then receives an instruction from the user to upload a ledger sheet (step S956), and transmits a previously stored PDF file to the server 200 (step S958). The PDF file may be a file of a document, table, or slide in a predetermined file format converted (i.e., exported) into a file format such as the PDF by another terminal apparatus 400. The following processes of steps S959 to S974 may be similar to the above-described processes of steps S909 to S924 in FIG. 9A.

In the server 200, the input receiving unit 221 receives input of the PDF file, and the authentication unit 222 transfers the PDF file to the processing unit 270 (step S959). The server 200 may transfer the PDF file from the input receiving unit 221 to the processing unit 270 without via the authentication unit 222.

In the processing unit 270 of the server 200, in response to receipt of the PDF file, the job list generating unit 272 registers a job in the job list (step S960), and the data storing unit 271 stores the PDF file in the PDF file DB 230 (step S961).

The processing unit 270 then acquires, from the PDF file DB 230, the PDF file to be subjected to the ledger sheet recognition (step S962), and executes the ledger sheet recognition process (step S963).

The processing unit 270 then stores the recognition result data generated by the item extracting unit 277 in the recognition result DB 260 (step S964).

In the information processing system 100, when the terminal apparatus 400 receives input of an instruction from the user to display the browser (step S965), the terminal apparatus 400 requests the server 200 to display the browser to display the recognition result data (step S966).

The terminal apparatus 400 further receives input of the authentication information from the user (step S967), and transmits the authentication information to the server 200 (step S968).

The server 200 performs the authentication of the user with the authentication unit 222 (step S969), and transmits a result of the authentication to the terminal apparatus 400 (step S970). The following processes are performed when the user is authenticated.

Then, the terminal apparatus 400 receives input of an instruction from the user to display the recognition result of the ledger sheet image (step S971), and requests the server 200 to display the recognition result of the ledger sheet image (step S972).

In response to the request to display the recognition result of the ledger sheet image, the server 200 acquires the recognition result data stored in the recognition result DB 260 (step S973), and generates and displays the recognition result check screen on the browser on the terminal apparatus 400 (step S974) to allow the user to check the recognition result on the displayed recognition result check screen. Then, the procedure is completed.

The job list generated by the job list generating unit 272 of the first embodiment will be described with FIG. 10.

FIG. 10 is a diagram illustrating an example of the job list of the first embodiment. In the server 200 of the first embodiment, in response to receipt of input of a PDF file from the image forming apparatus 300, the job list generating unit 272 holds the PDF file and a job ID associated therewith as a job list.

A job list 101 of the first embodiment includes information items: "job ID," "user ID," "ledger sheet image file path," "recognition result file path," "status," and "definition ID."

The value of the item "job ID" is an identifier for identifying the job, i.e., the PDF file received from the image forming apparatus 300.

The value of the item "user ID" is an identifier for identifying the user who has logged in to the information processing system 100.

The value of the item "ledger sheet image file path" is information of the location at which the PDF file is stored. The value of the item "recognition result file path" is information of the location at which the recognition result data resulting from the recognition of the ledger sheet image is stored.

The value of the item "status" represents the progress of the recognition of the ledger sheet image. The value of the item "definition ID" is the definition ID of the ledger sheet definition information to be referred to in the recognition of the ledger sheet image in the PDF file stored at the location represented by the value of the item "ledger sheet image file path."

In the server 200 of the first embodiment, in response to receipt of the PDF file from the image forming apparatus 300, the job list generating unit 272 adds a record to the job list 101 by assigning a job ID to the PDF file and associating the job ID with the user ID acquired as the authentication information. Then, when the PDF file is stored in the PDF file DB 230, the job list generating unit 272 adds the information of the storage location of the PDF file to the job list 101 as the value of the item "ledger sheet image file path."

Further, when the ledger sheet definition information to be referred to in the recognition of the ledger sheet image is identified, the job list generating unit 272 adds the definition ID of the ledger sheet definition information to the job list 101 as the value of the item "definition ID." Then, when the ledger sheet recognition is completed and the recognition result data is stored in the recognition result DB 260, the job list generating unit 272 adds the information of the storage location of the recognition result data to the job list 101 as the value of the item "recognition result file path," and sets the value of the item "status" as "completed."

A process of the processing unit 270 of the first embodiment will now be described with FIGS. 11A and 11B.

Figure 11A:
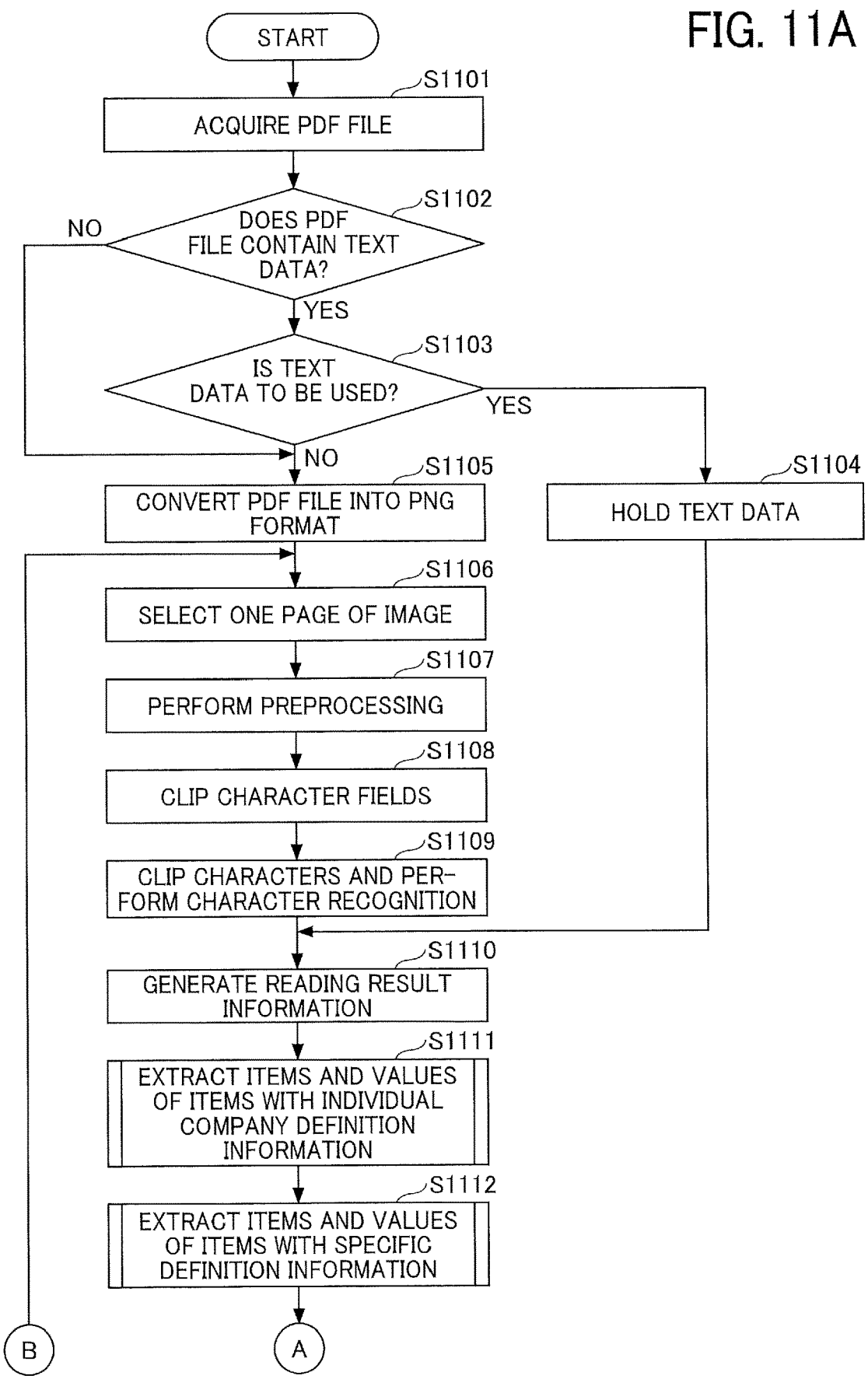
FIGS. 11A and 11B are a flowchart illustrating a process of a processing unit of the server of the first embodiment.
Figure 11B:
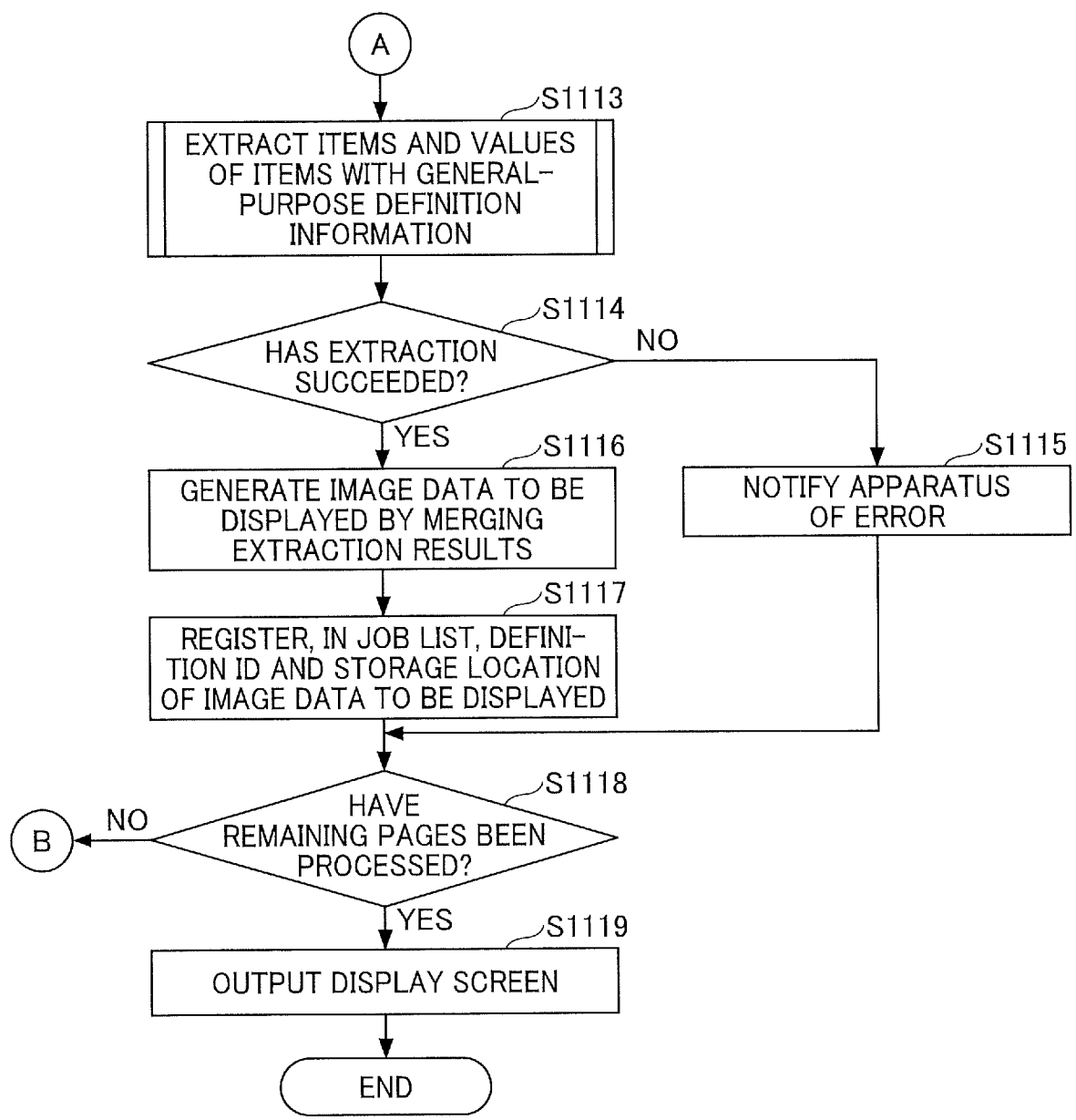

FIGS. 11A and 11B are a flowchart illustrating a process of the processing unit 270 of the first embodiment. FIGS. 11A and 11B illustrate details of the process of step S913 in FIG. 9A and the process of step S963 in FIG. 9B. It is assumed in the process of FIGS. 11A and 11B that the received PDF file contains image data having a plurality of pages.

The processing unit 270 acquires the PDF file from the PDF file DB 230 (step S1101). The processing unit 270 may be configured to proceed to the process of step S1102 when use of text data contained in the PDF file is set by the user of the terminal apparatus 400, and to proceed to the process of step S1105 when non-use of text data contained in the PDF file is set by the user of the terminal apparatus 400. The processing unit 270 then determines whether the acquired PDF file contains text data (step S1102). The PDF file received from the image forming apparatus 300 or the terminal apparatus 400 contains text data in one of the following first and second cases, for example.

In the first case, an apparatus such as another terminal apparatus 400 performs character recognition on an image in a PDF file generated through scanning (i.e., optical reading) of a print of a ledger sheet, and includes text data resulting from the character recognition in the PDF file. In this case, the text data included in the PDF file is an example of the first text data.

In the second case, an apparatus such as another terminal apparatus 400 converts a file containing text data of a document, table, or slide, for example, into a PDF file.

If the processing unit 270 determines that the acquired PDF file does not contain text data (NO at step S1102), the procedure proceeds to the process of step S1105.

If the processing unit 270 determines that the acquired PDF file contains text data (YES at step S1102), the processing unit 270 determines whether to use the text data (step S1103). In this process, the processing unit 270 may determine to use the text data if the acquired PDF file contains the text data subjected to the file format conversion, as in the second case described above. This process will be described later.

If the processing unit 270 determines to use the text data (YES at step S1103), the processing unit 270 holds the text data as the text data to be processed (i.e., an example of the first text data) (step S1104), and proceeds to the process of step S1110, which will be described later.

FIG. 12 is a diagram illustrating an example of the text data to be processed in the first embodiment. In the example of FIG. 12, a coordinate X, a coordinate Y, a character width, a character height, a degree of certainty, and a character are stored in association with an ID. Herein, the ID represents the ID of each character, i.e., each of characters C1 to C12. The coordinates X and Y represent the horizontal position and the vertical position, respectively, of the character corresponding to the ID. The character width and the character height represent the width and height, respectively, of the character corresponding to the ID. The degree of certainty represents the degree of accuracy of image recognition performed on the character corresponding to the ID. The degree of certainty is not an essential component of the text data.

Referring back to FIGS. 11A and 11B, if the processing unit 270 determines not to use the text data (NO at step S1103), the preprocessing unit 274 of the processing unit 270 converts the image in the PDF file into an image in a predetermined format, such as the portable network graphics (PNG) format or the joint photographic experts group (JPEG) format (step S1105).

The preprocessing unit 274 then selects one page of the image (step S1106), and performs preprocessing on the selected page of the image (step S1107). Specifically, the preprocessing includes a correction process of aligning the orientation of images, for example.

Then, in the processing unit 270, the character recognizing unit 275 clips areas each having a character formed therein (hereinafter referred to as the character fields) from the ledger sheet image (step S1108). The character recognizing unit 275 then clips the characters in the clipped character fields, performs character recognition on the clipped characters, and holds a result of the character recognition as the text data to be processed (i.e., an example of the second text data) (step S1109). In this process, the character recognizing unit 275 also acquires coordinates representing the positions of the clipped characters.

Then, the processing unit 270 generates reading result information based on the relative positions of the characters included in the text data to be processed (step S1110). Specifically, based on the coordinates of the recognized characters, the processing unit 270 recognizes characters separated from each other by a distance equal to or less than a preset threshold value as one character string. Then, the processing unit 270 generates the reading result information by associating the character string with information such as the coordinates representing the position of the area in which the character string is formed. Details of the reading result information will be described later.

Then, in the processing unit 270, the item extracting unit 277 extracts the items and the values of the items by using the reading result information and the individual company definition information 252 identified based on the type determination DB 240 (step S1111).

The item extracting unit 277 then extracts the items and the values of the items by using the reading result information and the specific definition information 253 identified based on the type determination DB 240 (step S1112).

Then, the item extracting unit 277 extracts the items and the values of the items by using the reading result information and the general-purpose definition information 251 identified based on the type determination DB 240 (step S1113).

The processing unit 270 then determines whether the extraction of the items and the values of the items has succeeded (step S1114). Specifically, the processing unit 270 may determine that the items and the values of the items have been successfully extracted if the items and the values of the items extracted by the item extracting unit 277 are found during the time from step S1111 to step S1113.

If the processing unit 270 determines at step S1114 that the extraction of the items and the values of the items has failed (NO at step S1114), the processing unit 270 notifies the terminal apparatus 400 or the image forming apparatus 300 of an error (step S1115), and proceeds to step S1118, which will be described later.

If the processing unit 270 determines at step S1114 that the extraction of the items and the values of the items has succeeded (YES at step S1114), the item extracting unit 277 of the processing unit 270 generates the recognition result data by merging the extracted items and values of the items such that the items are associated with the values of the items (step S1116). Details of the merging process will be described later.

Then, the job list generating unit 272 of the processing unit 270 registers, in the job list 101, the definition ID of the ledger sheet definition information used to generate the recognition result data and the storage location of the recognition result data (step S1117). Then, the processing unit 270 determines whether all of the remaining pages of the image have been processed (step S1118). If the processing unit 270 determines at step S1118 that all of the remaining pages of the image have not been processed (NO at step S1118), the processing unit 270 returns to step S1106.

If the processing unit 270 determines at step S1118 that all of the remaining pages of the image have been processed (YES at step S1118), the display screen generating unit 278 of the processing unit 270 causes the terminal apparatus 400 to display (i.e., output) the recognition result check screen generated with the recognition result data (step S1119). Thereby, the procedure is completed.

The above-described process example in FIGS. 11A and 11B includes the display of the recognition result data. The display of the recognition result data, however, is not limited to this example. The processing unit 270 may display the recognition result data in response to receipt of a request from the terminal apparatus 400 to display the recognition result data.

Figure 13:
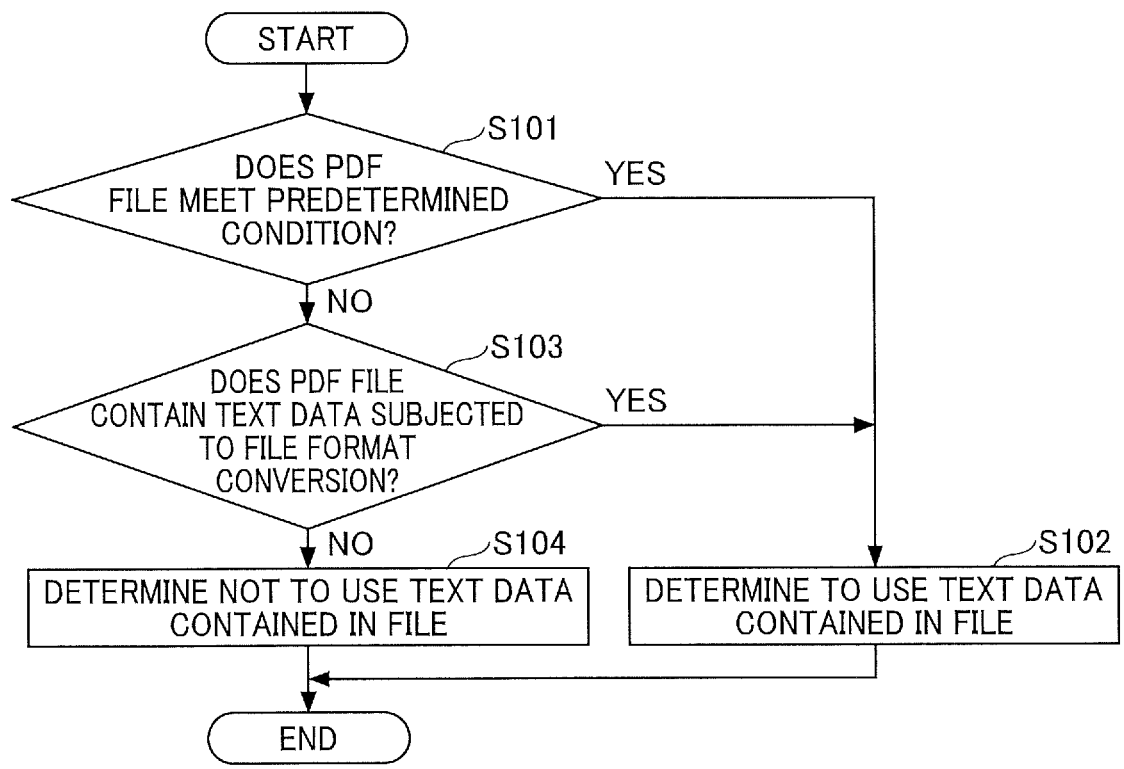
FIG. 13 is a flowchart illustrating an example of a text data use determination process of the first embodiment.

With reference to FIG. 13, a description will be given of an example of the process of step S1103 in FIG. 11A, i.e., a text data use determination process.

FIG. 13 is a flowchart illustrating an example of the text data use determination process of the first embodiment.

At step S101, the processing unit 270 determines whether the acquired PDF file meets a predetermined condition. In this process, the processing unit 270 may determine that the acquired PDF file meets the predetermined condition if an extended area of the acquired PDF file contains information indicating that the text data in the acquired PDF file has been subjected to the character recognition by a function of an application or service provided by a predetermined company, for example. This is because, if the predetermined company is the provider of the server 200, for example, the result of character recognition previously included in the PDF file and the result of character recognition performed by the server 200 are considered to be equal in accuracy. With this configuration, the processing load of the character recognition on the server 200 is reduced. The information of the extended area may be set by a character recognition module of the image forming apparatus 300, for example.

Further, the processing unit 270 may determine that the acquired PDF file meets the predetermined condition if the extended area of the acquired PDF file contains predetermined information set by the user of the terminal apparatus 400, for example. With this configuration, the user is able to specify whether to use the text data in the PDF file or to use the result of character recognition performed on the image in the PDF file by the server 200.

If the processing unit 270 determines that the acquired PDF file meets the predetermined condition (YES at step S101), the processing unit 270 determines to use the text data contained in the PDF file (step S102), and completes the procedure.

If the processing unit 270 determines that the acquired PDF file does not meet the predetermined condition (NO at step S101), the processing unit 270 determines whether the acquired PDF file contains the text data subjected to the file format conversion (step S103). In this process, the processing unit 270 may make this determination by using one or more of the following conditions, for example. That is, the processing unit 270 may make this determination by combining a plurality of conditions included in the following conditions.

For example, if the acquired PDF file does not contain image data having at least a predetermined display size (i.e., if the PDF file does not contain any image data or contains image data having a display size smaller than the predetermined display size), the processing unit 270 may determine that the PDF file contains the text data subjected to the file format conversion. The processing unit 270 may determine the predetermined display size in accordance with the display size of each of the pages of the image in the PDF file. In this case, the processing unit 270 may determine the predetermined display size as 80% of the display size of each of the pages of the image in the PDF file, for example. This is because, if the PDF file is generated by scanning A4-size printed materials, for example, the area of each of the A4-size pages excluding a margin is considered to be the display area of the image generated by the scanning.

Further, if the PDF file is acquired from the image forming apparatus 300, the processing unit 270 may determine that the acquired PDF file does not contain the text data subjected to the file format conversion. In this case, the processing unit 270 may determine that the PDF file has been acquired from the image forming apparatus 300 if the acquired PDF file has been received via a communication port conforming to a predetermined communication protocol for receiving PDF files from the image forming apparatus 300, for example.

Further, the processing unit 270 may determine that the acquired PDF file does not contain the text data subjected to the file format conversion if the PDF file contains text data resulting from character recognition on an image generated by optically reading printed materials, for example. In this case, the processing unit 270 may determine that the acquired PDF file contains the text data resulting from the character recognition on the image if the extended area of the PDF file contains information indicating that the text data has been subjected to the character recognition, for example. The information in the extended area may be set by the character recognition module of the image forming apparatus 300, for example.

If the processing unit 270 determines that the acquired PDF file contains the text data subjected to the file format conversion (YES at step S103), the processing unit 270 proceeds to the process of step S102. In the process of converting a file into a PDF file, text data contained in the original file is retained, and thus the text data contained in the PDF file after the conversion is original text data not subjected to the character recognition process. According to this conversion process, therefore, if the file to be processed is a PDF file converted from a file of a document, for example, it is possible to use the same text data as the original text data included in the document.

If the processing unit 270 determines that the acquired PDF file does not contain the text data subjected to the file format conversion (NO at step S103), the processing unit 270 determines not to use the text data contained in the PDF file (step S104), and completes the procedure. If the accuracy of the character recognition of the text data contained in the PDF file is not guaranteed, therefore, it is possible to avoid using the text data and to use the text data obtained through character recognition performed by the server 200.

Another example of the text data use determination process of step S1103 in FIG. 11A will now be described with FIGS. 14 and 15.

Figure 14:
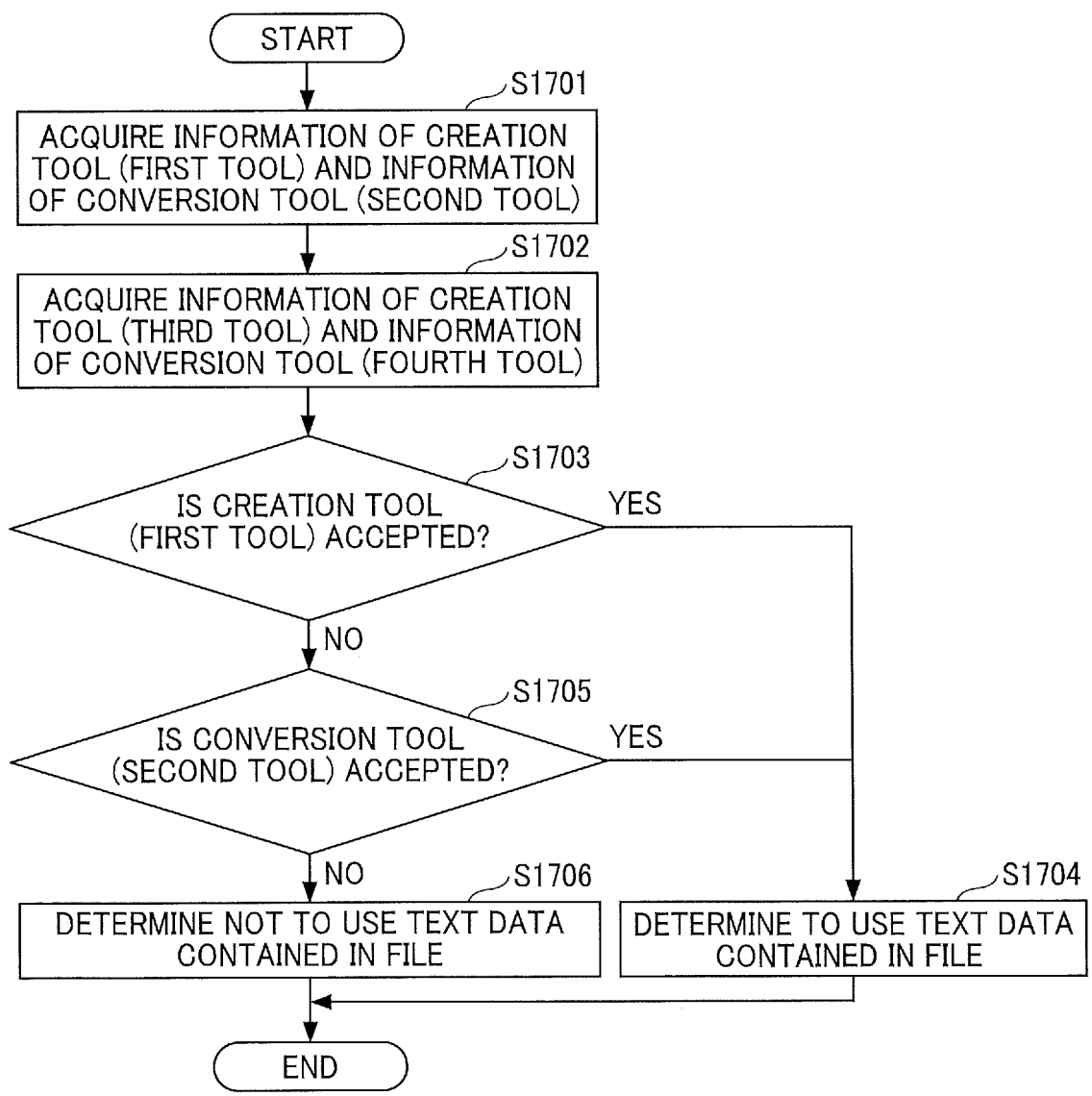
FIG. 14 is a flowchart illustrating another example of the text data use determination process of the first embodiment.

FIG. 14 is a flowchart illustrating another example of the text data use determination process of the first embodiment. FIG. 15 is a diagram illustrating an example of a setting screen of the terminal apparatus 400 of the first embodiment. The processing unit 270 may execute the process of FIG. 14 in combination with the foregoing process of FIG. 12.

At step S1701, the processing unit 270 acquires information representing a first tool and information representing a second tool from attribute information (i.e., metadata) of the acquired PDF file, for example. Herein, the term "tool" refers to an application program. The first tool is used to create original data in a format other than PDF, i.e., source data converted into the data in the acquired PDF file. The second tool is used to convert the original data into the PDF file data.

According to the data structure of PDF specified by the international organization for standardization (ISO) 32000-1 standard, a PDF file contains information of header, body, cross-reference table, and trailer. In the trailer of the PDF file, an item "Info" includes metadata of document information dictionary.

For example, the processing unit 270 may acquire, as the information representing the first tool, information representing a creation tool associated with an item "Creator" in metadata items included in the document information dictionary. When the PDF file is generated through format conversion of a first file in a format other than PDF, the original data in the first file is created by this creation tool.

Further, for example, the processing unit 270 may acquire, as the information representing the second tool, information representing a conversion tool associated with an item "Producer" in the metadata items included in the document information dictionary. When the PDF file is generated through format conversion of a third file in a format other than PDF, the third file is converted into the PDF file by this conversion tool.

The processing unit 270 then acquires information representing a third tool and information representing a fourth tool (step S1702). The third tool is accepted as a creation tool for creating the text data contained in the PDF file. The fourth tool is accepted as a conversion tool for converting the text data. The third and fourth tools may previously be set. Further, the third and fourth tools may previously be set by the user of the terminal apparatus 400. Further, the third tool may be set with a keyword indicating the third tool and a condition for determining the match between the keyword and the information representing the first tool. Similarly, the fourth tool may be set with a keyword indicating the fourth tool and a condition for determining the match between the keyword and the information representing the second tool. For example, partial match, exact match, forward match, or backward match may be set as the condition for determining the match.

Figure 15:
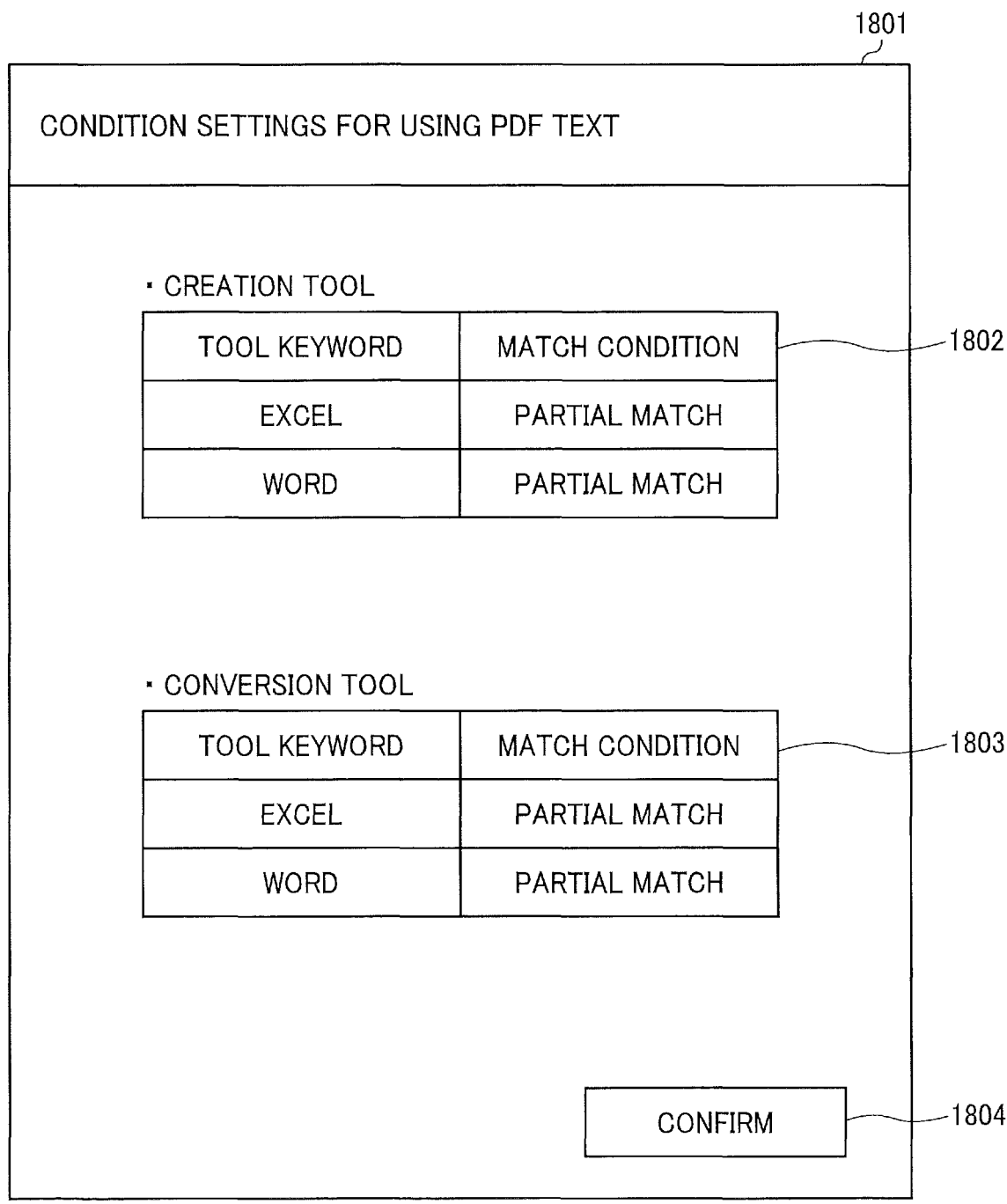
FIG. 15 is a diagram illustrating an example of a setting screen of a terminal apparatus forming the information processing system of the first embodiment.

In the example of FIG. 15, the terminal apparatus 400 displays, on a display screen 1801, creation tool condition settings 1802, conversion tool condition settings 1803, and a confirm button 1804.

In the creation tool condition settings 1802 in the example of FIG. 15, "Excel" and "Word" are specified by the user as keywords indicating the third tool, and "partial match" is specified as the condition for determining the match between each of the keywords and the first tool. Similarly, in the conversion tool condition settings 1803, "Excel" and "Word" are specified by the user as keywords indicating the fourth tool, and "partial match" is specified as the condition for determining the match between each of the keywords and the second tool.

If the confirm button 1804 is pressed, the terminal apparatus 400 transmits the user-specified information of the creation tool condition settings 1802 and the conversion tool condition settings 1803 to the server 200. Then, the server 200 stores the user-specified setting information.

Then, the processing unit 270 determines whether the creation tool is accepted (step S1703). In this step, if the first tool acquired at step S1701 matches the third tool acquired at step S1702, the processing unit 270 determines that the creation tool is accepted.

In this case, if the information representing the first tool is "Microsoft Word 2016 Professional," the information representing the third tool is "Excel" and "Word," and the specified condition is "partial match," for example, the processing unit 270 may determine that the first tool matches the third tool.

If it is determined that the creation tool is accepted (YES at step S1703), the processing unit 270 determines to use the text data contained in the PDF file (step S1704), and completes the procedure.

If it is determined that the creation tool is not accepted (NO at step S1703), the processing unit 270 determines whether the conversion tool is accepted (step S1705). In this step, if the second tool acquired at step S1701 matches the fourth tool acquired at step S1702, the processing unit 270 determines that the conversion tool is accepted.

In this case, if the information representing the second tool is "Microsoft Word 2016 Professional," the information representing the fourth tool is "Excel" and "Word," and the specified condition is "partial match," for example, the processing unit 270 may determine that the second tool matches the fourth tool. Further, if the information representing the second tool is "PDF Easy Parse," the information representing the fourth tool is "Excel" and "Word," and the specified condition is "partial match," for example, the processing unit 270 may determine that the second tool does not match the fourth tool.

If it is determined that the conversion tool is accepted (YES at step S1705), the processing unit 270 proceeds to the process of step S1704. If it is determined that the conversion tool is not accepted (NO at step S1705), the processing unit 270 determines not to use the text data contained in the PDF file (step S1706), and completes the procedure.

When the creation or conversion tool applied to the original data does not guarantee the accuracy of the text data contained in the converted PDF file, therefore, the text data in the PDF file is not used, and the text data subjected to the character recognition by the server 200 is used instead.

A process of the item extracting unit 277 of the first embodiment will now be described with reference to FIG. 16.

Figure 16:
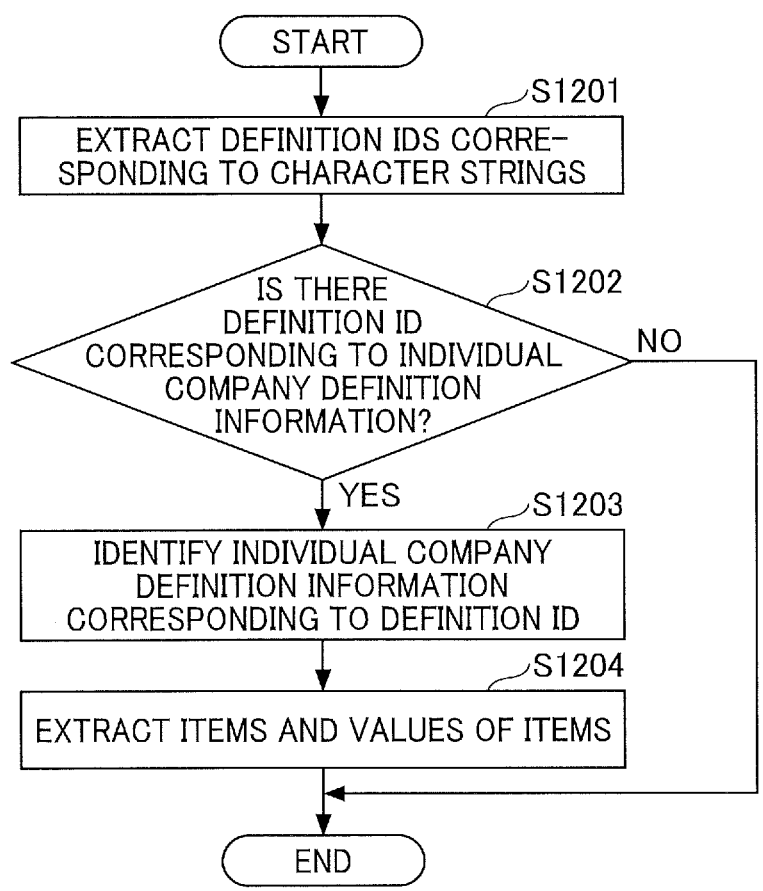
FIG. 16 is a flowchart illustrating a process of an item extracting unit of the processing unit of the first embodiment.

FIG. 16 is a flowchart illustrating a process of the item extracting unit 277 of the first embodiment. FIG. 16 illustrates details of the process of step S1111 in FIG. 11A.

In the processing unit 270 of the first embodiment, when the reading result information is held, the definition identifying unit 276 extracts, from the type determination DB 240, the definition IDs corresponding to the identification character strings included in the reading result information (step S1201).

The definition identifying unit 276 then determines whether the extracted definition IDs include a definition ID corresponding to the individual company definition information 252 as the definition type (step S1202). That is, in this process, the definition identifying unit 276 determines whether the individual company definition information 252 is registered for the type of ledger sheet represented by the identification character strings included in the reading result information.

If the definition identifying unit 276 determines at step S1202 that the extracted definition IDs do not include the above-described definition ID (NO at step S1202), the individual company definition information 252 defining the layout unique to the user is not registered for this type of ledger sheet. Therefore, the item extracting unit 277 completes the procedure, and proceeds to step S1112 in FIG. 11A.

If the definition identifying unit 276 determines at step S1202 that the extracted definition IDs include the above-described definition ID (YES at step S1202), the definition identifying unit 276 refers to the ledger sheet definition DB 250 and identifies the individual company definition information 252 including the definition ID (step S1203). When the extracted definition IDs include the above-described definition ID, the ledger sheet has the layout unique to the user.

Then, based on the identified individual company definition information 252, the item extracting unit 277 extracts the items and the values of the items from the reading result information, and associates the items with the values of the items (step S1204).

The process at step S1112 of extracting the items and the values of the items by using the specific definition information 253 and the process at step S1113 of extracting the items and the values of the items by using the general-purpose definition information 251 are similar to the process at step S1111 of extracting the items and the values of the items by using the individual company definition information 252 except that the individual company definition information 252 at step S1111 is replaced by the specific definition information 253 or the general-purpose definition information 251. Thus, description of the processes of steps S1112 and S1113 will be omitted.

The generation of the reading result information of the first embodiment will now be described.

Figure 17:
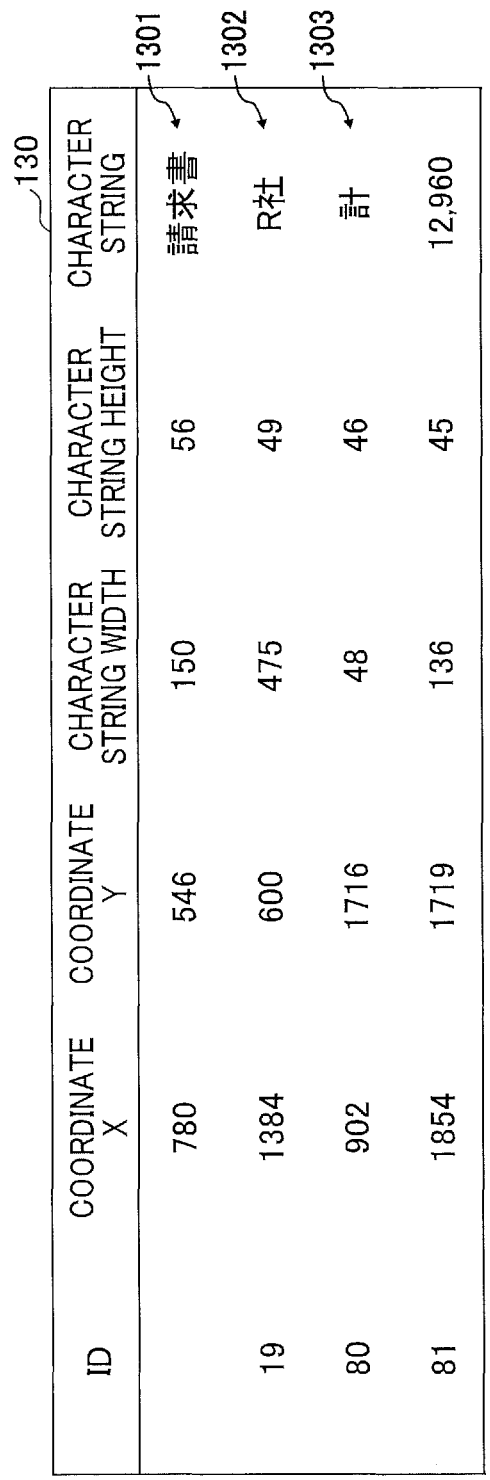
FIG. 17 is a diagram illustrating an example of reading result information of the first embodiment.

FIG. 17 is a diagram illustrating an example of the reading result information of the first embodiment. Reading result information 130 illustrated in FIG. 17 is extracted from a result of recognizing characters in character fields clipped from a PDF file of a certain invoice sheet and coordinates representing the positions of the characters, for example. In the reading result information 130, character strings 1301, 1302, and 1303 are translated as "invoice sheet," "Corporation R," and "total," respectively.

The reading result information 130 includes the character strings 1301 and 1302 (i.e., "invoice sheet" and "Corporation R"). Herein, the definition identifying unit 276 refers to the type determination DB 240, and extracts therefrom the definition IDs corresponding to the identification character strings matching the character strings included in the reading result information 130. In this case, the definition IDs "H01" and "A01" illustrated in FIG. 4 are extracted.

The definition identifying unit 276 then identifies, among the extracted definition IDs, the definition ID corresponding the individual company definition information 252 as the definition type. In this case, the definition ID "A01" is identified. That is, it is understood that the ledger sheet from which the reading result information 130 is extracted is set with the individual company definition information 252 corresponding to the definition ID "A01."

Then, the item extracting unit 277 refers to the individual company definition information 252 in the ledger sheet definition DB 250 corresponding to the definition ID "A01," as illustrated in FIG. 7.

According to the definition of the individual company definition information 252, the character string in the area under an item "total" corresponding to the item ID "2" and representing the billing amount is the value of an item name "total." Therefore, the item extracting unit 277 extracts the character string 1303 (i.e., "total") in the reading result information 130 as the item name "total," and extracts a character string "12,960" in the area under the character string "total" as the value of the item name "total."

The item extracting unit 277 thus extracts, from the reading result information 130, the character strings corresponding to the item names defined in the individual company definition information 252 and the character strings representing the values of the items. After the item extracting unit 277 completes the extraction of the character strings corresponding to the item names defined in the individual company definition information 252 and the character strings representing the values of the items, the definition identifying unit 276 determines whether the extracted definition IDs include a definition ID corresponding to the specific definition information 253 as the definition type.

In the present example, the extracted definition IDs do not include a definition ID corresponding to the specific definition information 253 as the definition type. That is, it is understood that the ledger sheet from which the reading result information 130 is extracted is not defined by the specific definition information 253.

The definition identifying unit 276 then determines whether the extracted definition IDs include a definition ID corresponding to the general-purpose definition information 251 as the definition type. In the present example, the definition ID "H01" is identified. That is, it is understood that the ledger sheet from which the reading result information 130 is extracted is also defined by the general-purpose definition information 251 corresponding to the definition ID "H01."

Then, the item extracting unit 277 refers to the general-purpose definition information 251 corresponding to the definition ID "H01" illustrated in FIG. 6, and extracts the character strings corresponding to the item names and the values of the items defined in the general-purpose definition information 251, similarly as in the extraction of character strings with reference to the individual company definition information 252.

The general-purpose definition information 251 defines all of the item names and the values of the items included in the ledger sheet of the document type "invoice sheet". With reference to the general-purpose definition information 251, therefore, the item names and the values of the items not defined by the individual company definition information 252 are extracted.

Further, unlike the definition of the individual company definition information 252, according to the definition of the general-purpose definition information 251, the character string in the area at the lower-right corner of the item "total sum" corresponding to the item ID "2" and representing the billing amount is the value of the item name "total sum." In the present example, the reading result information 130 does not include the character string "total sum," and thus the item extracting unit 277 determines that there is no value in the item corresponding to the item ID "2."

If the reading result information 130 includes the character string "total sum," the item extracting unit 277 extracts the character string "total sum" included in the reading result information 130 as the item name "total sum," and extracts the character string in the area at the lower-right corner of the character string "total sum" as the value of the item name "total sum."

In the first embodiment, different types of ledger sheet definition information are thus referred to to extract the item names and the values of the items based on the respective types of ledger sheet definition information.

The merging process of the item extracting unit 277 will be described below.

If the item name and the value of the item corresponding to a certain item ID are extracted based on each of different types of ledger sheet definition information, the item extracting unit 277 of the first embodiment employs the item name and the value of the item extracted based on the type of ledger sheet definition information having the highest priority to generate the recognition result data.

In the first embodiment, the individual company definition information 252 is set with the highest priority among the general-purpose definition information 251, the individual company definition information 252, and the specific definition information 253. This is because the definition of the individual company definition information 252 is uniquely set by the user, and thus should be most preferentially referred to.

Further, in the first embodiment, the specific definition information 253 is set with the second highest priority next to the individual company definition information 252, and the general-purpose definition information 251 is set with the lowest priority.

Therefore, if the item name and the value of the item corresponding to a certain item ID are extracted based on each of the three types of ledger sheet definition information, for example, the item name and the value of the item extracted based on the individual company definition information 252 are employed.

Specifically, for example, the general-purpose definition information 251 and the individual company definition information 252 both define the item corresponding to the item ID "2."

In the first embodiment, therefore, the item name and the value of the item extracted based on the general-purpose definition information 251 and the item name and the value of the item extracted based on the individual company definition information 252 exist for the item corresponding to the item ID "2."

For the item corresponding to the item ID "2" in this case, the item extracting unit 277 uses the item name and the value of the item extracted based on the individual company definition information 252 to generate the recognition result data. Specifically, the item extracting unit 277 extracts the character string "12,960" as the value of the item based on the individual company definition information 252, and also determines that the value of the item is absent based on the general-purpose definition information 251. In this case, the item extracting unit 277 uses the character string "12,960" extracted based on the individual company definition information 252 of the higher priority to generate the recognition result data.

Since a typical invoice sheet uses "total sum" as the item name of the item representing the billing amount, the item "total sum" is set in the general-purpose definition information 251. Meanwhile, the invoice sheet to the user A from Corporation R uses not "total sum" but "total" as the item name. In this type of invoice sheet, therefore, the billing amount is not recognized if the general-purpose definition information 251 is referred to. To extract the billing amount from the invoice sheet to the user A from Corporation R, therefore, the individual company definition information 252 unique to the user A and set with the item "total" is used.

Further, if the invoice sheet to the user A from Corporation R uses "total sum" as the item name of the item representing the billing amount, but if the position at which the value of the item is described is different from that in the typical invoice sheet, the values of items such as the direction and distance corresponding to the item name "total sum" in the individual company definition information 252 unique to the user A may be set to be different from those in the general-purpose definition information 251.

Further, the item corresponding to an item ID "10" defined in the general-purpose definition information 251 is not defined in the individual company definition information 252. For the item corresponding to the item ID "10," therefore, the item name and the value of the item are extracted based on the general-purpose definition information 251. For the item corresponding to the item ID "10," therefore, the item extracting unit 277 uses the item name and the value of the item extracted based on the general-purpose definition information 251 to generate the recognition result data.

As described above, in the first embodiment, the plural types of ledger sheet definition information are set with different priorities. Among the item names and the values of the items extracted based on the respective types of ledger sheet definition information, the item names and the values of the items extracted based on the type of ledger sheet definition information having the highest priority are used to generate the recognition result data as the result of recognizing the ledger sheet image.

FIG. 18 is a diagram illustrating an example of the recognition result check screen of the first embodiment. FIG. 18 illustrates a screen 140 as an example of the screen displayed on the terminal apparatus 400. The screen 140 displays a recognition result generated as a result of recognizing the ledger sheet.

The screen 140 displays a ledger sheet image 141 read by the image forming apparatus 300 and information 142 in which the items and the values of the items extracted by the processing unit 270 are associated with each other. The screen 140 further displays a register button 143. The user refers to the ledger sheet image 141 to check the displayed items and values of the items, and, if necessary, corrects the values of the items. If the user selects the register button 143, the corrected values of the items are registered as the recognition result data.

In the first embodiment, image data of the ledger sheet image 141 and the information 142 may be stored in the core system 500 in response to selection of the register button 143, for example. Further, the user may download the registered recognition result data via the recognition result check screen and register the downloaded recognition result data in the core system 500 via an operation screen of the core system 500.

The screen 140 may further display information 144 representing the type of ledger sheet definition information referred to in the recognition of the ledger sheet image 141. In the first embodiment, the thus-displayed information 144 notifies the user which type of ledger sheet definition information has been used to recognize the ledger sheet image 141.

An example of the recognition result data of the first embodiment will be described below.

FIG. 19 is a diagram illustrating an example of the recognition result data of the first embodiment. In recognition result data 151 illustrated in FIG. 19, a result of extracting the items and the values of the items included in the ledger sheet image data, associating the items with the values of the items, and associating the item IDs of the items with the values of the items is described in the XML format.

In the first embodiment, when the recognition result data 151 is generated and stored in the recognition result DB 260, the storage location of the recognition result data 151 is set as the value of the item "recognition result file path" in the job list 101 illustrated in FIG. 10.

A second embodiment of the present invention will be described.

In the second embodiment, a description will be given of an example in which the server 200 generates text data by translating content in a file received from the image forming apparatus 300 or the terminal apparatus 400. The second embodiment is similar to the first embodiment except for some aspects, and thus redundant description will be omitted as appropriate. The following description will be given of differences from the first embodiment, and description of similarities to the first embodiment will be omitted.

A process of the processing unit 270 of the second embodiment will be described with reference to FIG. 20.

Figure 20:
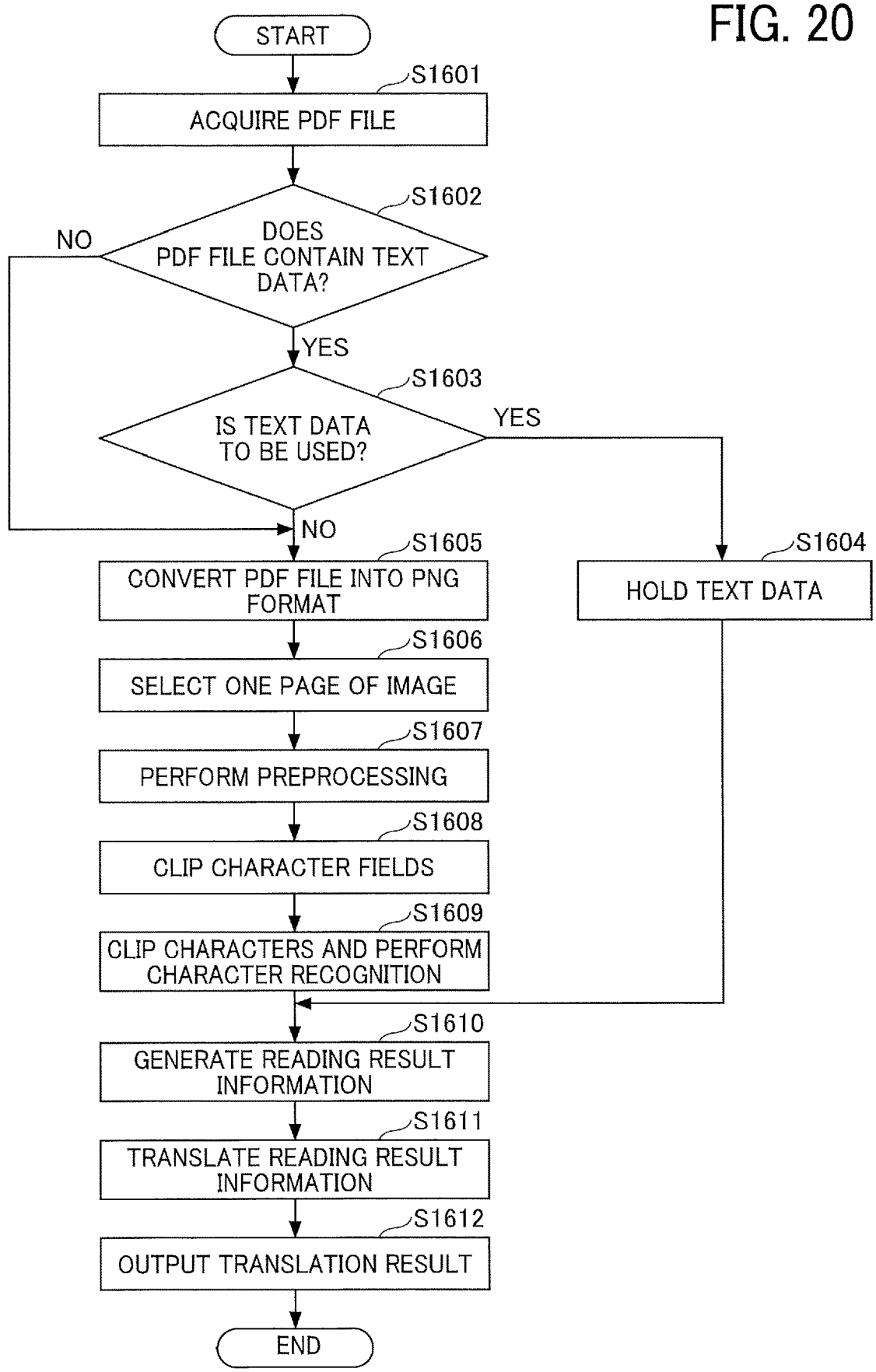
FIG. 20 is a flowchart illustrating a process of the processing unit of a second embodiment of the present invention.

FIG. 20 is a flowchart illustrating a process of the processing unit 270 of the second embodiment. The processing unit 270 acquires a PDF file from the PDF file DB 230 (step S1601), and determines whether the acquired PDF file contains text data (step S1602).

If the processing unit 270 determines that the acquired PDF file does not contain text data (NO at step S1602), the processing unit 270 proceeds to the process of step S1605. If the processing unit 270 determines that the acquired PDF file contains text data (YES at step S1602), the processing unit 270 determines whether to use the text data (step S1603).

If the processing unit 270 determines to use the text data (YES at step S1603), the processing unit 270 holds the text data as the text data to be processed (i.e., an example of the first text data) (step S1604), and proceeds to the process of step S1610, which will be described later. If the processing unit 270 determines not to use the text data (NO at step S1603), the preprocessing unit 274 of the processing unit 270 converts the data in the PDF file into an image in a predetermined format such as the PNG format or the JPEG format (step S1605).

The preprocessing unit 274 then selects one page of the image (step S1606), and performs preprocessing on the selected page of the image (step S1607).

Then, in the processing unit 270, the character recognizing unit 275 clips areas each having a character formed therein (i.e., the character fields) from the selected page of the image (step S1608). The character recognizing unit 275 then clips the characters in the clipped character fields, performs the character recognition on the clipped characters, and holds a result of the character recognition as the text data to be processed (i.e., an example of the second text data) (step S1609).

Then, the processing unit 270 generates the reading result information based on the relative positions of characters included in the text data to be processed (step S1610). The processes of steps S1601 to 1610 may be similar to those of steps S1101 to S1110 in FIG. 11A.

Then, the processing unit 270 translates the reading result information (step S1611), and outputs a result of the translation to the terminal apparatus 400 (step S1612). By uploading, to the server 200, a PDF file containing data of an English-written article acquired from a certain web site, for example, the user is able to acquire data of the article translated into another language such as Japanese.

Modified examples of the embodiments of the present invention will be described.

The functional units of the server 200 may be implemented by cloud computing formed by one or more computers, for example. Further, the server 200 and the terminal apparatus 400 may be integrated together. Further, the server 200 may include at least part of the functions of the image forming apparatus 300 and the terminal apparatus 400.

According to an existing ledger sheet recognition method, a printed paper document of a facsimile-transmitted invoice sheet has been converted into electronic data, such as PDF data, for example, and subjected to character recognition and ledger sheet recognition. In recent years, however, it has become more common to prepare an invoice sheet with a tool such as document preparation software, convert the data of the invoice sheet into a PDF file, and transmit the PDF file by electronic mail instead of facsimile.

According to the existing ledger sheet recognition method, however, there is still room for improvement in character recognition rate, depending on the type of character to be recognized (e.g., one-byte Japanese character), for example.

When an invoice sheet prepared with a tool such as document preparation software is formatted into a PDF file, for example, text data contained in this PDF-formatted file is considered to be accurate. According to the foregoing embodiments, if the file to be processed contains the text data subjected to the file format conversion, for example, the server 200 performs a process such as the ledger sheet recognition with the text data contained in the file, thereby improving the accuracy of the text data to be used. Further, if the file to be processed contains the first text data obtained through the character recognition performed on an image generated by optically reading a printed material, for example, the server 200 performs character recognition on the file to generate the second text data, and performs the process such as the ledger sheet recognition with the second text data.

Further, an embodiment of the invention also provides an information processing method. The information processing method includes acquiring an electronic file containing first text data, and determining, based on the acquired electronic file, whether to use the first text data or second text data to perform a process. The second text data is generated through character recognition performed on an image contained in the acquired electronic file.

In the information processing method, the acquired electronic file may contain data in the PDF.

The information processing method may further include performing the process with the first text data when the acquired electronic file is generated through format conversion of an electronic file containing text data.

The information processing method may further include performing the process with the second text data when the acquired electronic file contains image data having a display size equal to or greater than a threshold value.

The information processing method may further include performing the process with the second text data when the acquired electronic file contains information indicating that the first text data is generated through character recognition performed on an image.

The information processing method may further include performing the process with the second text data when the acquired electronic file is acquired from an image forming apparatus.

The information processing method may further include performing the process with the first text data when the acquired electronic file contains information indicating that the first text data is generated through character recognition performed by a function provided by a certain company.

The information processing method may further include acquiring an electronic file of a ledger sheet, and performing the process to extract data of a certain item from the ledger sheet.

The information processing method may further include determining, based on attribute information of the acquired electronic file, whether to use the first text data or the second text data to perform the process.

The information processing method may further include determining, based on creation tool information included in the attribute information of the acquired electronic file, whether to use the first text data or the second text data to perform the process. The creation tool information represents a creation tool used to create a first electronic file. The acquired electronic file is a second electronic file generated through format conversion of the first electronic file.

The information processing method may further include determining, based on conversion tool information included in the attribute information of the acquired electronic file, whether to use the first text data or the second text data to perform the process. The conversion tool information represents a conversion tool used to convert a third electronic file into a fourth electronic file. The acquired electronic file is the fourth electronic file.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions. Further, the above-described steps are not limited to the order disclosed herein.

The invention claimed is:

1. An information processing apparatus comprising:
processing circuitry configured to
acquire an electronic file containing first text data, and
determine, based on conversion tool information included in attribute information of the acquired electronic file, whether to use the first text data or second text data to perform a process, the second text data being generated through character recognition performed on an image contained in the acquired electronic file, and the conversion tool information representing a conversion tool used to convert an electronic file that contains no text data into the acquired electronic file.

2. The information processing apparatus of claim 1, wherein the acquired electronic file contains data in portable document format.

3. The information processing apparatus of claim 1, wherein the processing circuitry acquires an electronic file of a ledger sheet, and performs the process to extract data of a certain item from the ledger sheet.

4. An information processing method comprising:
acquiring an electronic file containing first text data, and
determining, based on conversion tool information included in attribute information of the acquired electronic file, whether to use the first text data or second text data to perform a process, the second text data being generated through character recognition performed on an image contained in the acquired electronic file, and the conversion tool information representing a conversion tool used to convert an electronic file that contains no text data into the acquired electronic file.

5. A non-transitory recording medium storing a plurality of instructions which, when executed by one or more processors, cause the processors to perform an information processing method comprising:
acquiring an electronic file containing first text data, and
determining, based on conversion tool information included in attribute information of the acquired electronic file, whether to use the first text data or second text data to perform a process, the second text data being generated through character recognition performed on an image contained in the acquired electronic file, and the conversion tool information representing a conversion tool used to convert an electronic file that contains no text data into the acquired electronic file.

6. The information processing apparatus of claim 1, wherein the circuitry is configured to use the first text data when the conversion tool that is indicated by the conversion tool information is permitted.

7. The information processing apparatus of claim 1, wherein the circuitry is configured to use the second text data when the conversion tool that is indicated by the conversion tool information is not permitted.

8. The information processing apparatus of claim 1, wherein the circuitry is configured to use the first text data when the conversion tool that is indicated by the conversion tool information is permitted by a user.

9. The information processing apparatus of claim 1, wherein the circuitry is further configured to store a coordinate X, a coordinate Y, a width, and a height of a character of the first text data, and the character of the first text data in association with identification data (ID) ID of the first text data upon determining that the first text data is used.

10. The information processing apparatus of claim 9, wherein the storing further includes storing a degree of certainty upon determining that the first text data is used.

11. The information processing apparatus of claim 9, wherein the circuitry is further configured to, before performing the process:
convert the image into portable network graphics (PNG) format;
select one page of the image;
perform a preprocessing;
clip character fields; and
clip characters and perform character recognition.

12. The information processing apparatus of claim 11, wherein the preprocessing includes correcting an inclination of the image.

* * * * *